United States Patent [19]

Nicely et al.

[11] Patent Number: 4,839,801
[45] Date of Patent: Jun. 13, 1989

[54] ARCHITECTURE FOR BLOCK PROCESSING COMPUTER SYSTEM

[75] Inventors: Mark C. Nicely, Mountain View; Ronald Leavitt, San Jose; Joel Mannion, Sunnyvale, all of Calif.; Rob Schreiber, Latham, N.Y.; Gary R. Lang, Saratoga, Calif.; Robert L. Papenberg, San Jose, Calif.; Joseph E. Straub, San Jose, Calif.

[73] Assignee: Saxpy Computer Corporation, Sunnyvale, Calif.

[21] Appl. No.: 926,764

[22] Filed: Nov. 3, 1986

[51] Int. Cl.[4] .................. G06F 3/00; G06F 13/12; G06F 15/347; G06F 9/22
[52] U.S. Cl. .................................. 364/200; 364/900
[58] Field of Search ... 364/200 MS File, 900 MS File

[56] References Cited

U.S. PATENT DOCUMENTS

| | | | |
|---|---|---|---|
| 4,080,649 | 3/1978 | Calle et al. | 364/200 |
| 4,161,784 | 7/1979 | Cushing et al. | 364/200 |
| 4,450,525 | 5/1984 | Demuth et al. | 364/200 |
| 4,660,143 | 4/1987 | King et al. | 364/200 |
| 4,661,900 | 4/1987 | Chen et al. | 364/200 |
| 4,706,191 | 11/1987 | Hamstra et al. | 364/200 |

Primary Examiner—Gareth D. Shaw
Assistant Examiner—Viet Q. Nguyen
Attorney, Agent, or Firm—Townsend and Townsend

[57] ABSTRACT

A block processing computing system includes a decomposition unit, a control circuit, a system memory, a data block path and a block processor. The decomposition unit receives externally-supplied primitive command packets and decomposes the primitive into machine language operations on computational blocks of data. The control circuitry generates control and address signals for performing the machine level operations. The data block path includes alignment circuitry for selecting data from burst-accessed blocks of data and a macropipeline for controllably storing and transferring blocks of data to and from the block processor. The block processor has interchangeable, double-buffered local zone memories and a parallel set of pipelined vector processors for performing block operations on computational blocks of data.

32 Claims, 22 Drawing Sheets

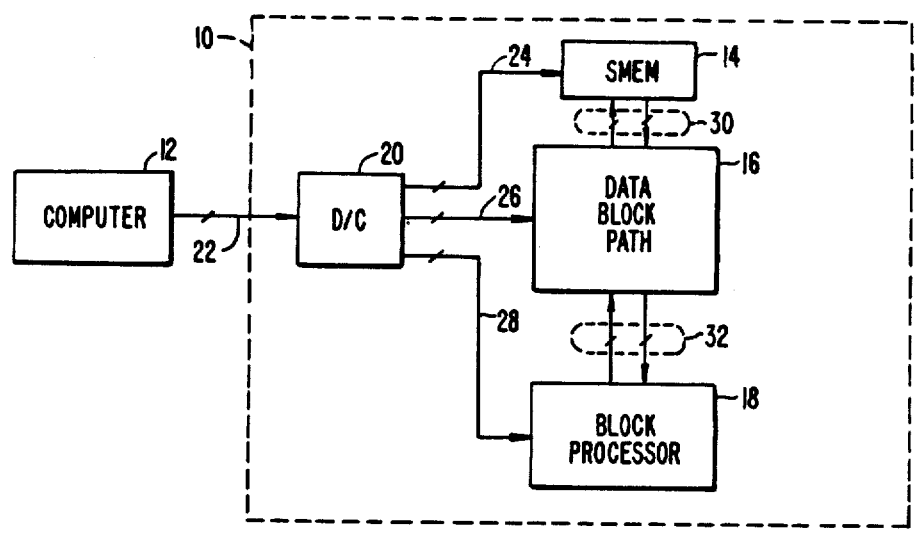
FIG._1.
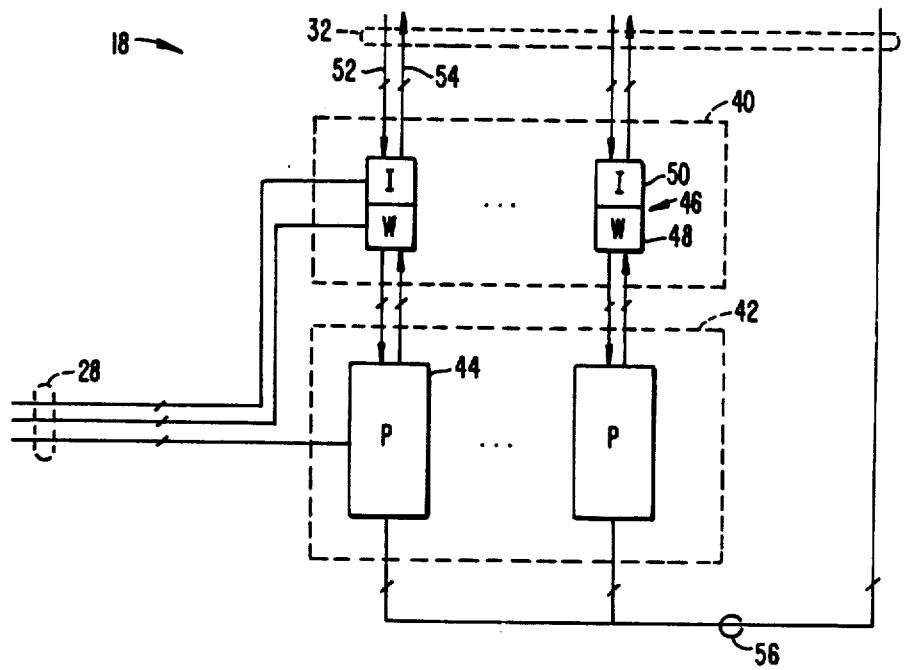
FIG._2.

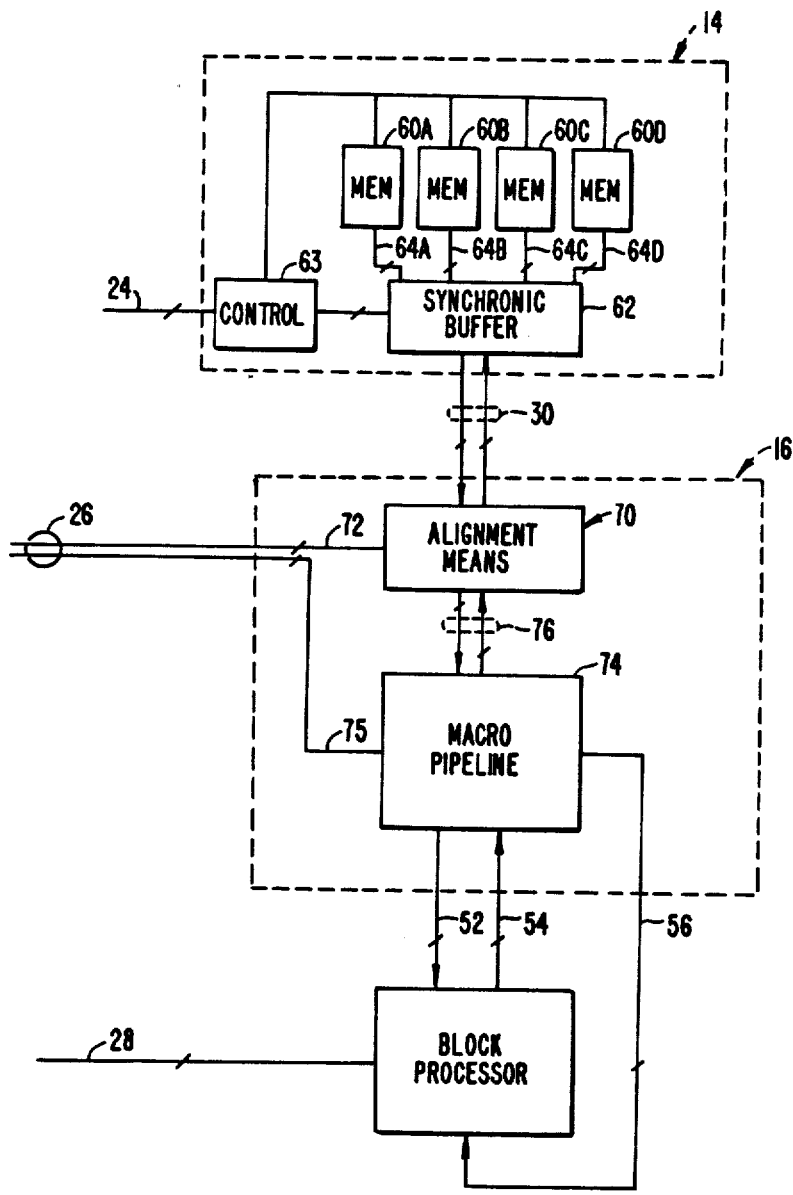
FIG._3.

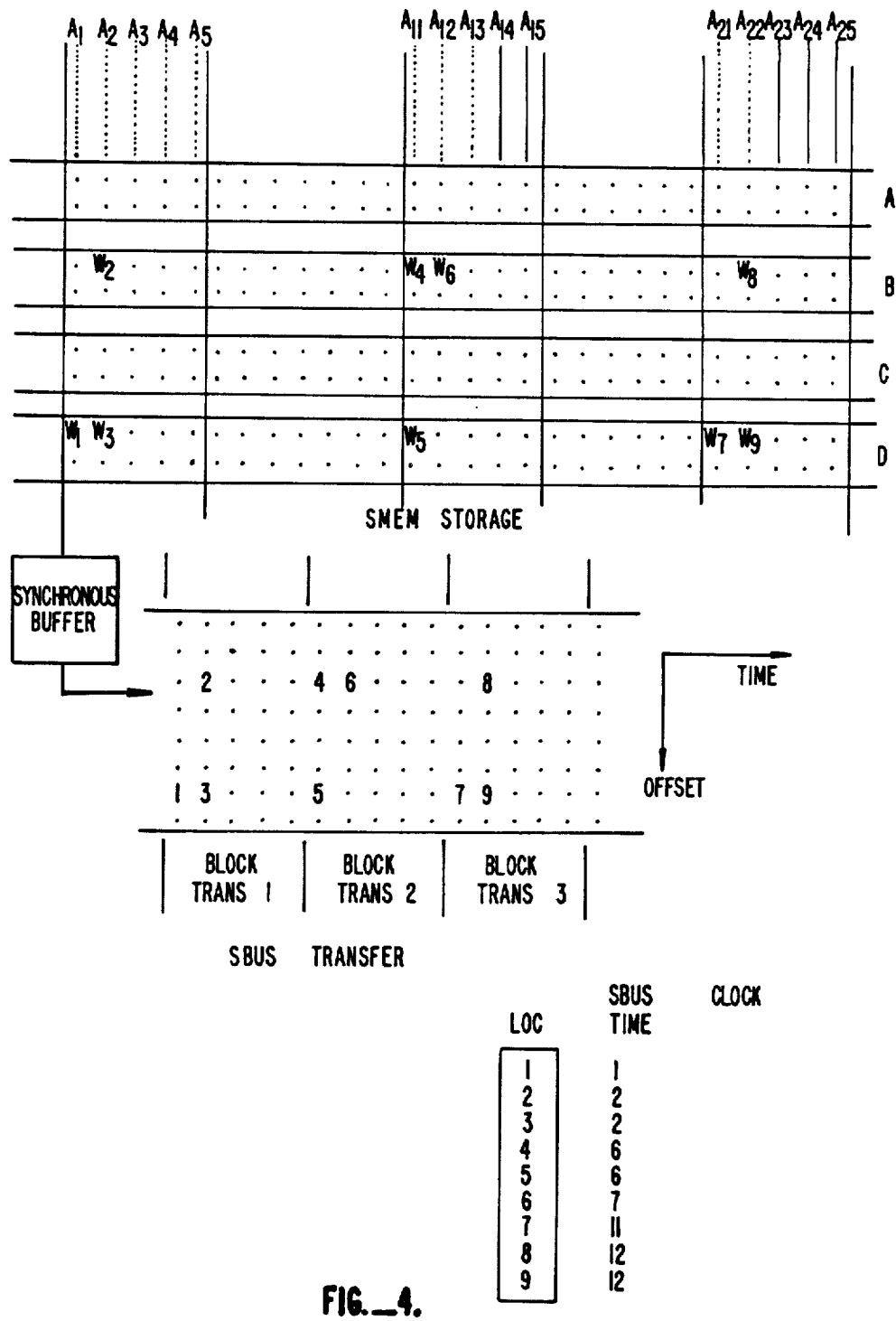
FIG._4.

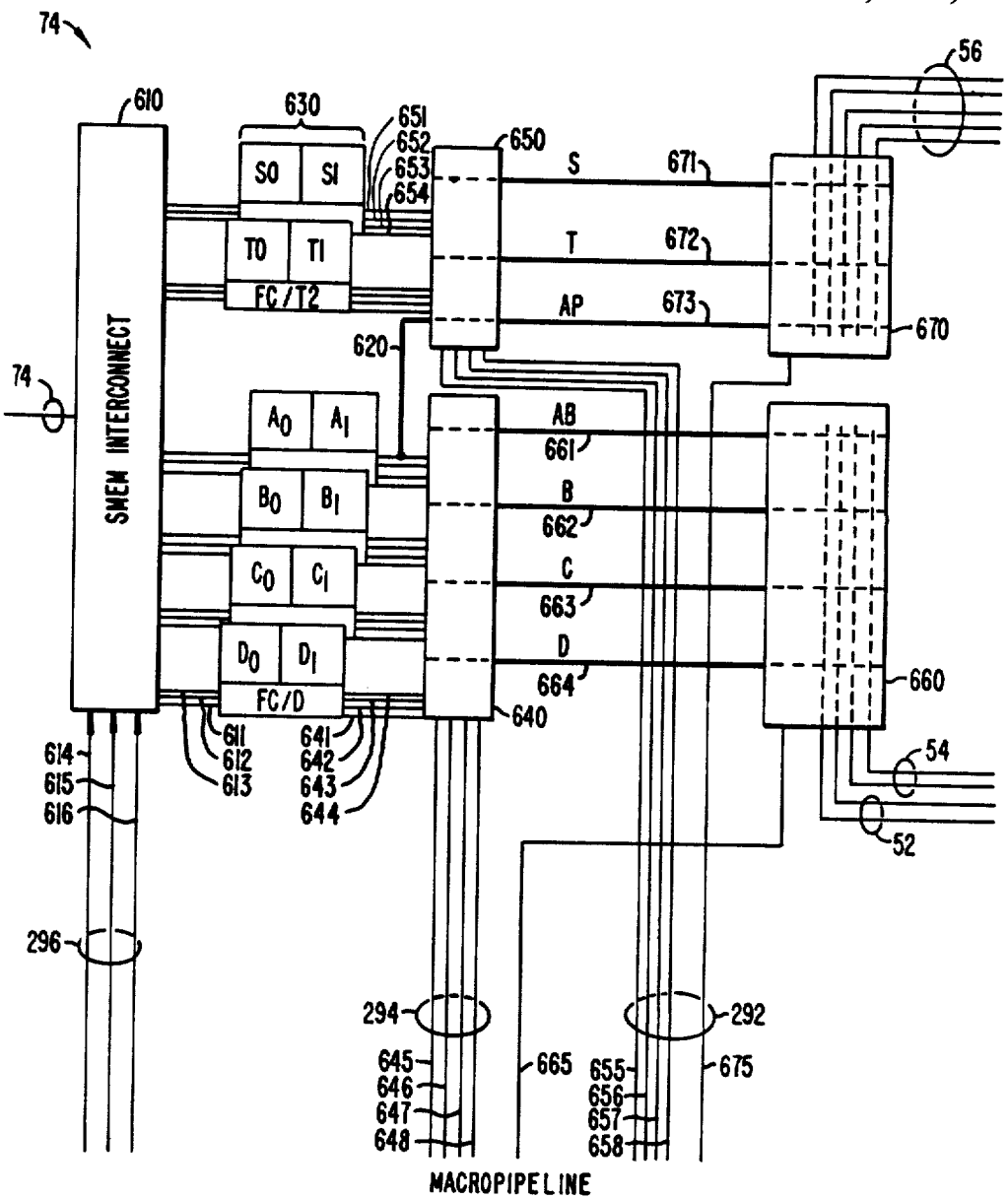
FIG._5.

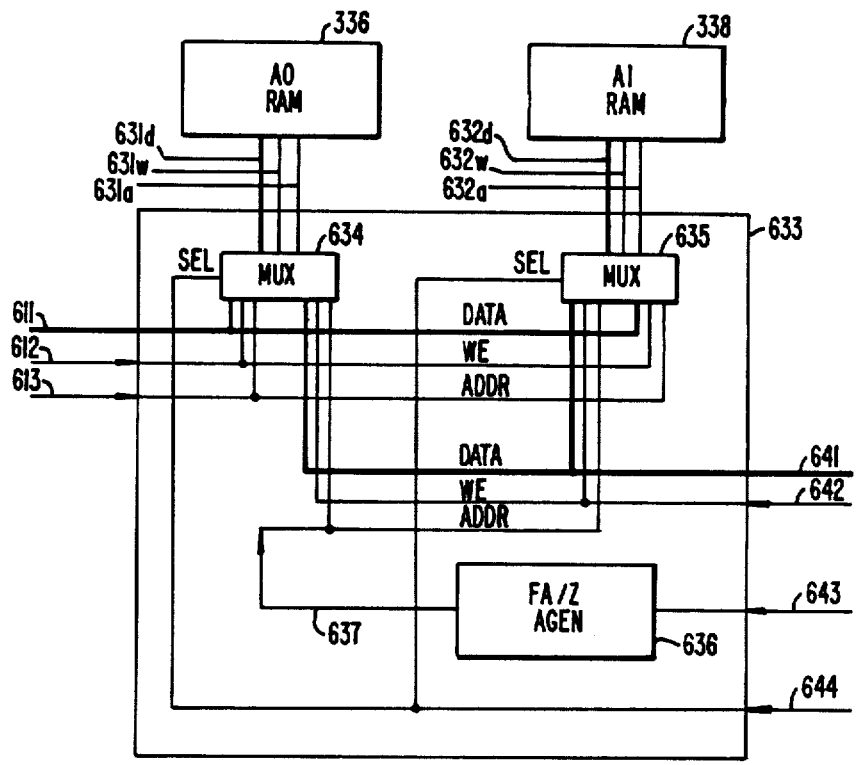
FIG._6.
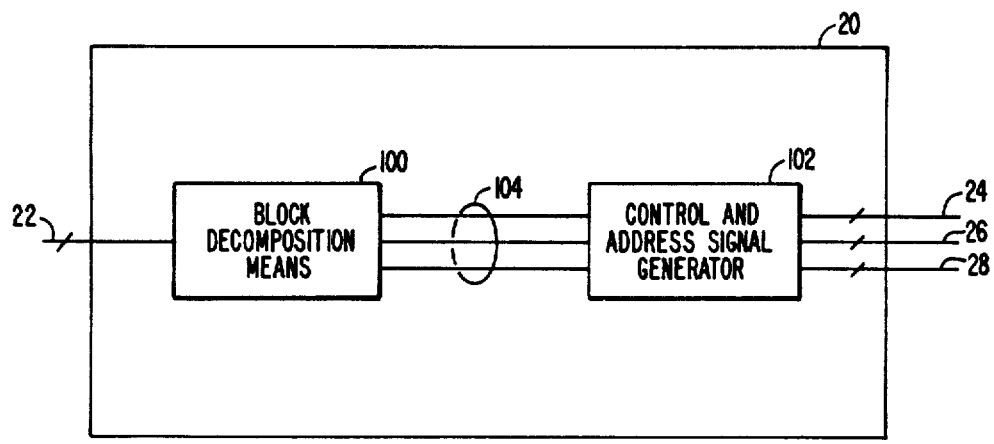
FIG._7.

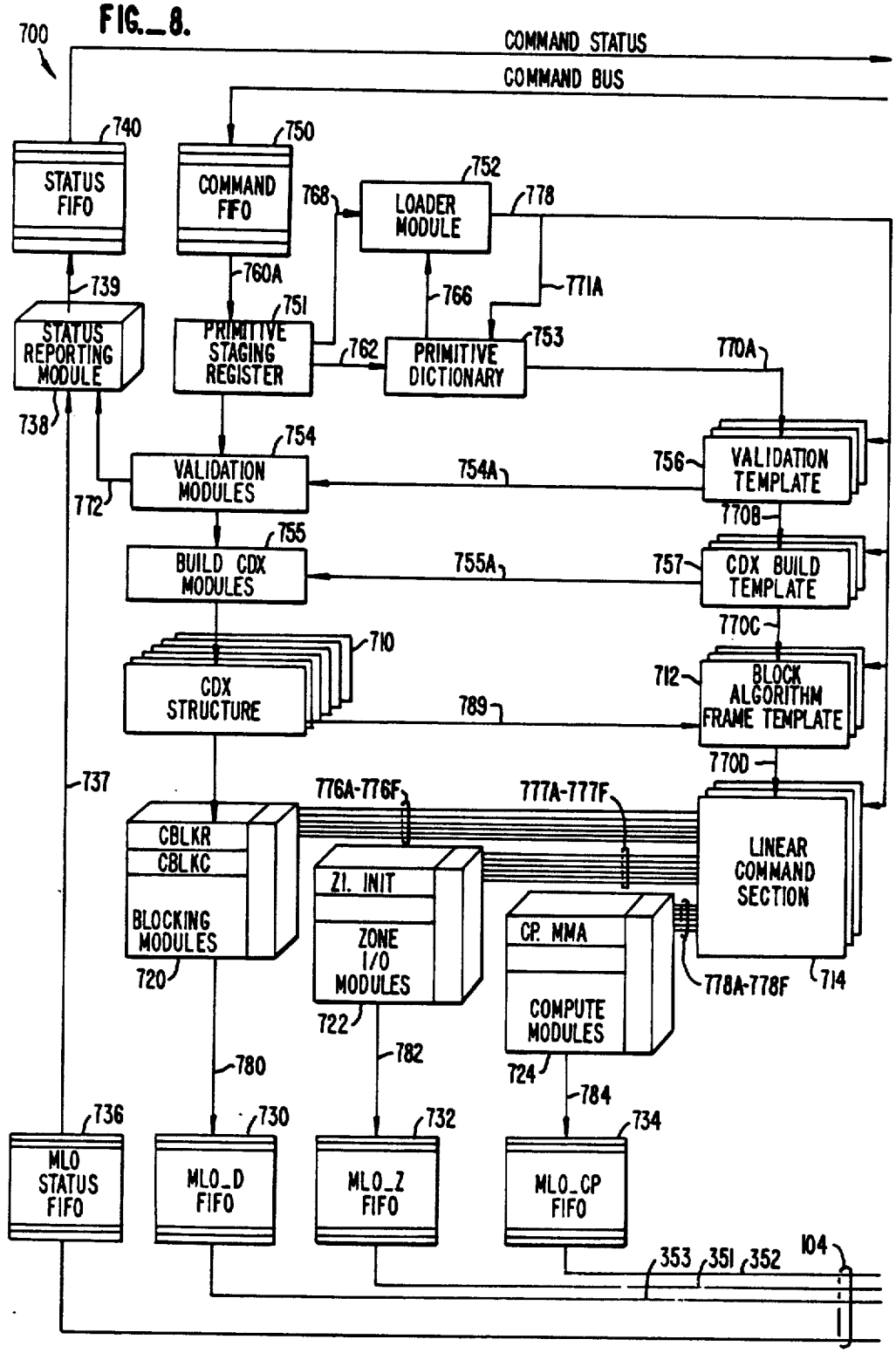
FIG._8.

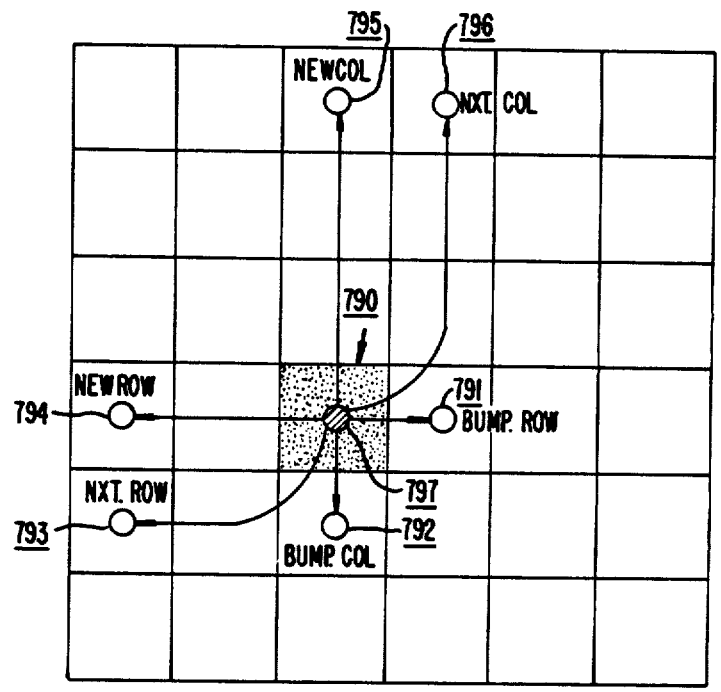
FIG._9.

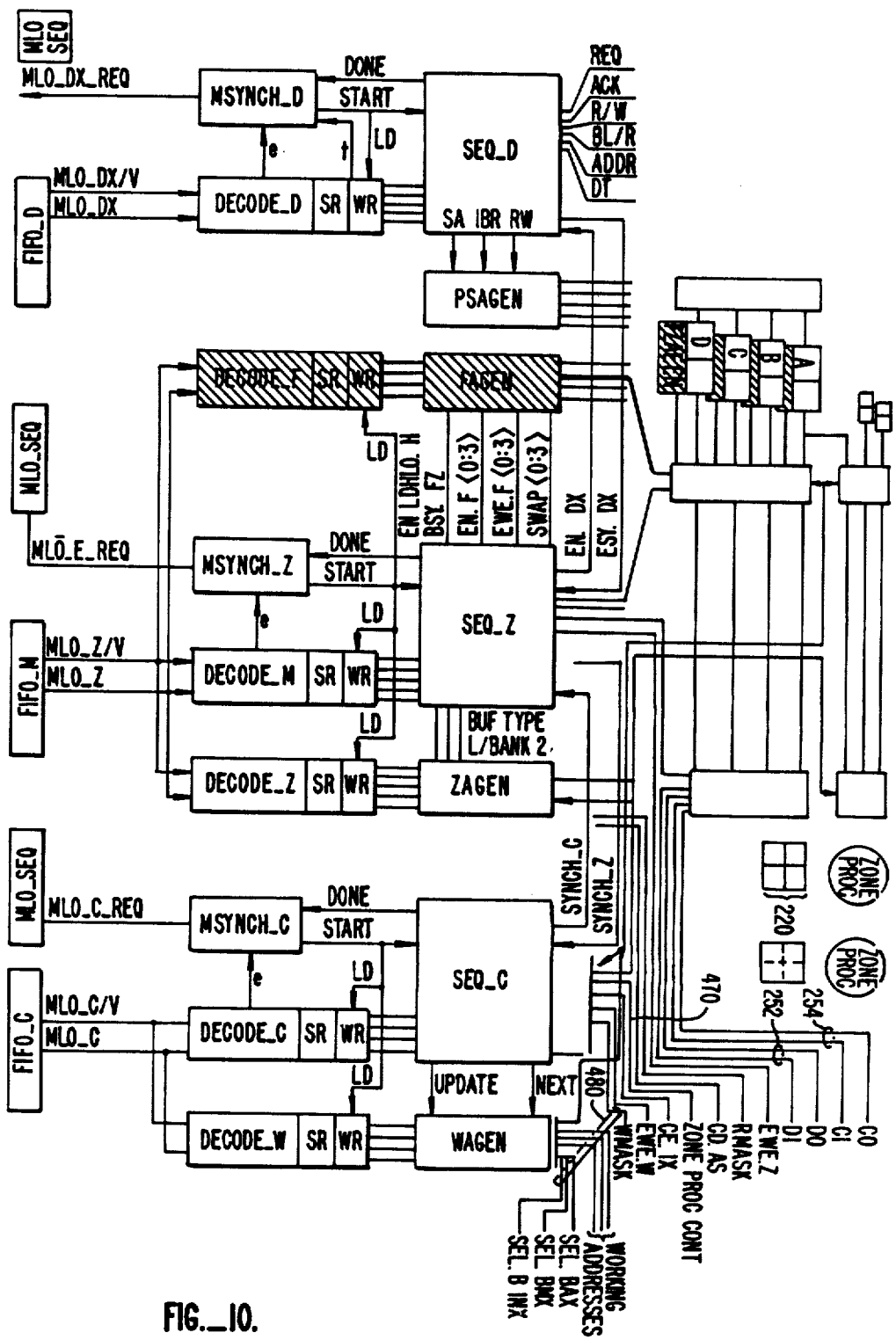
FIG._10.

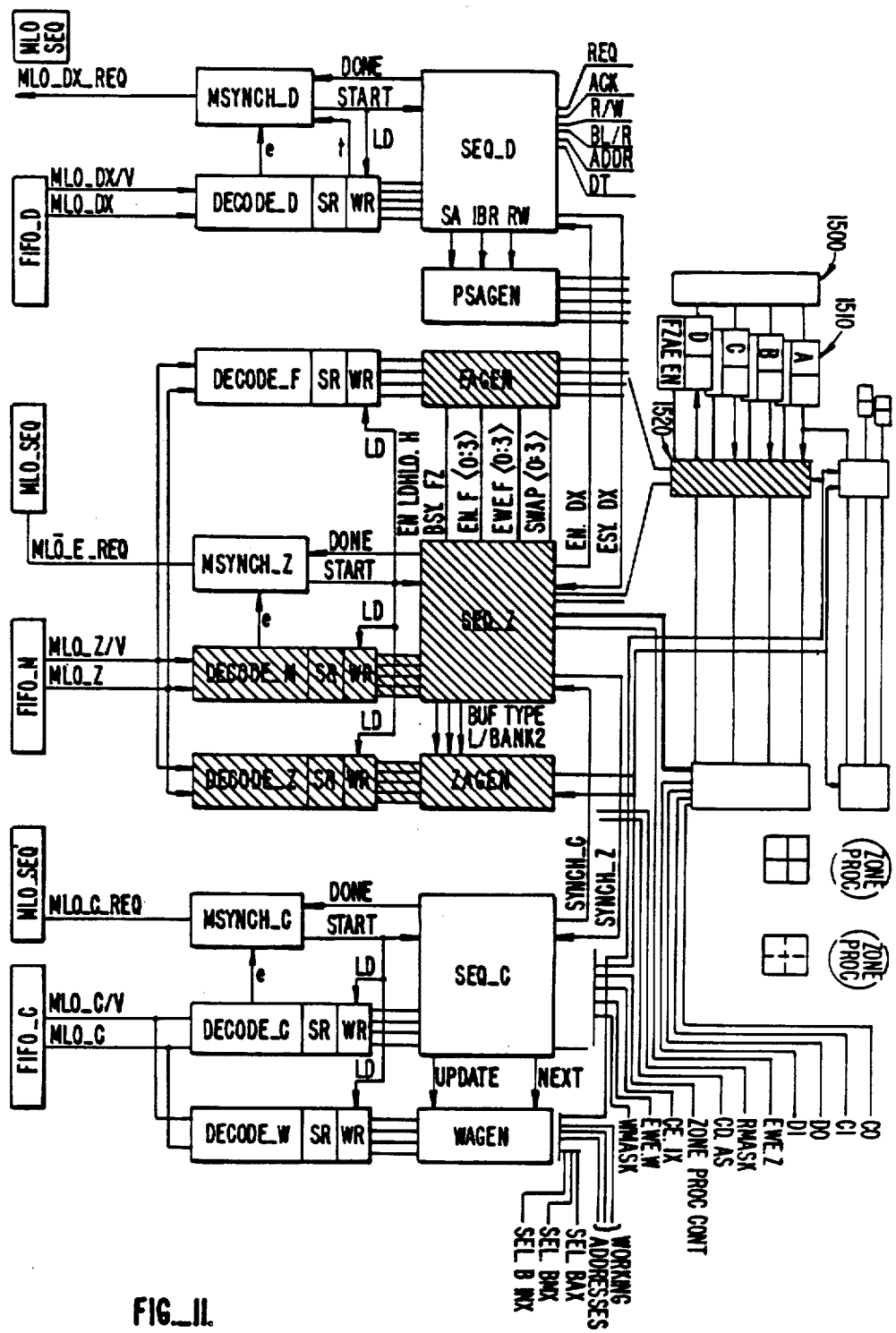
FIG._11.

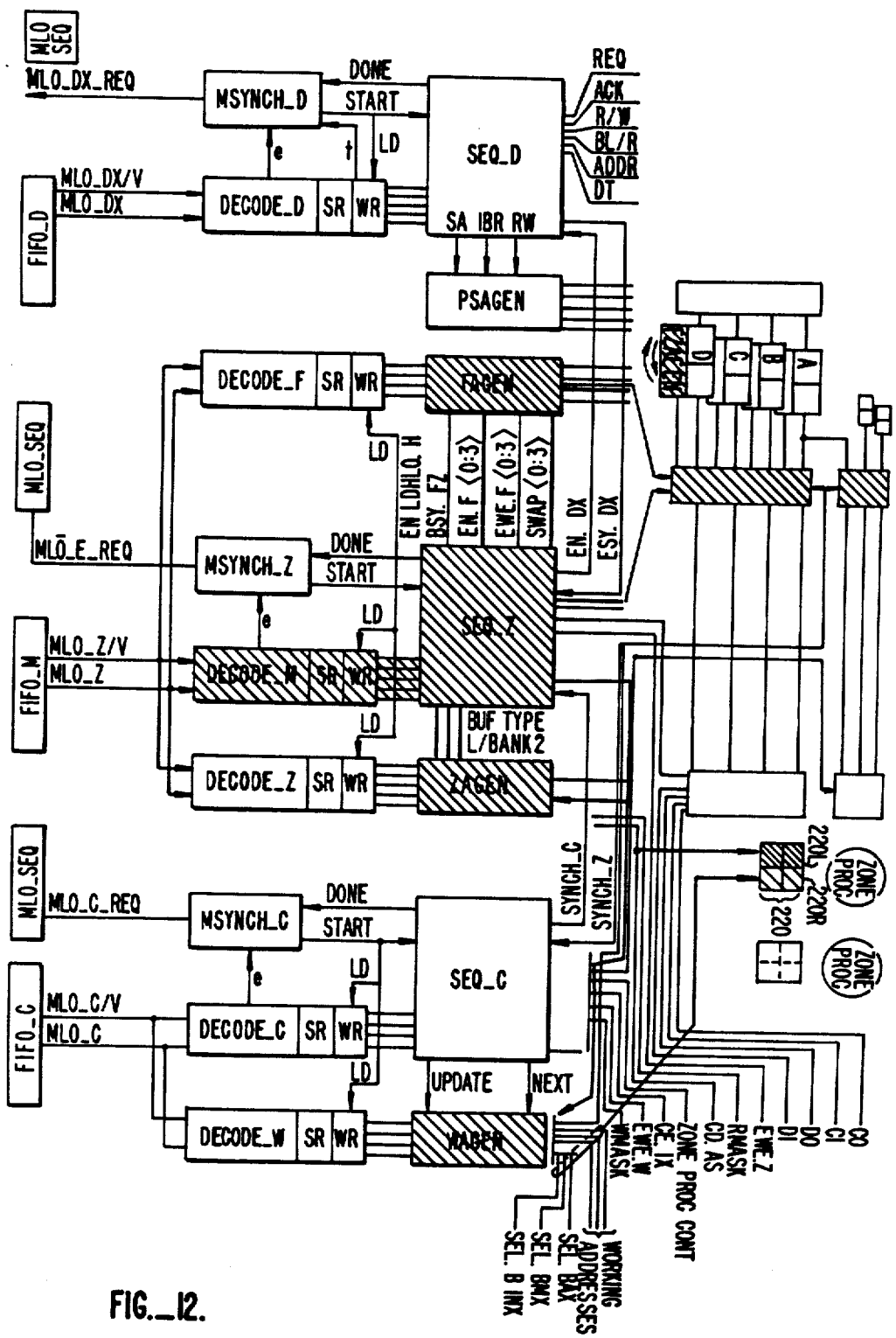
FIG._12.

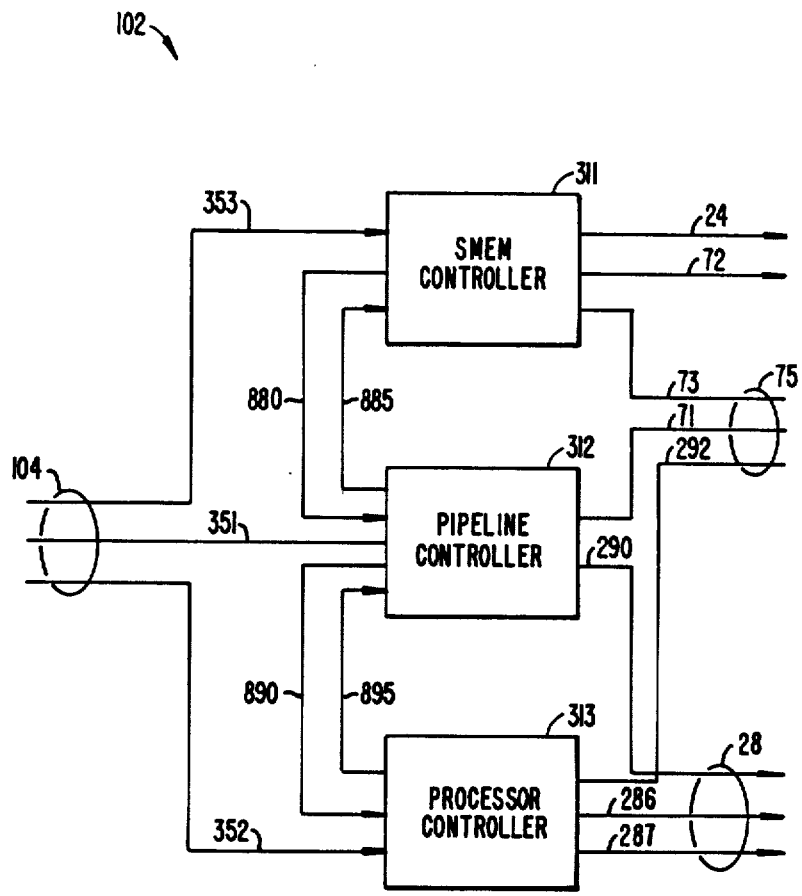
FIG._13.

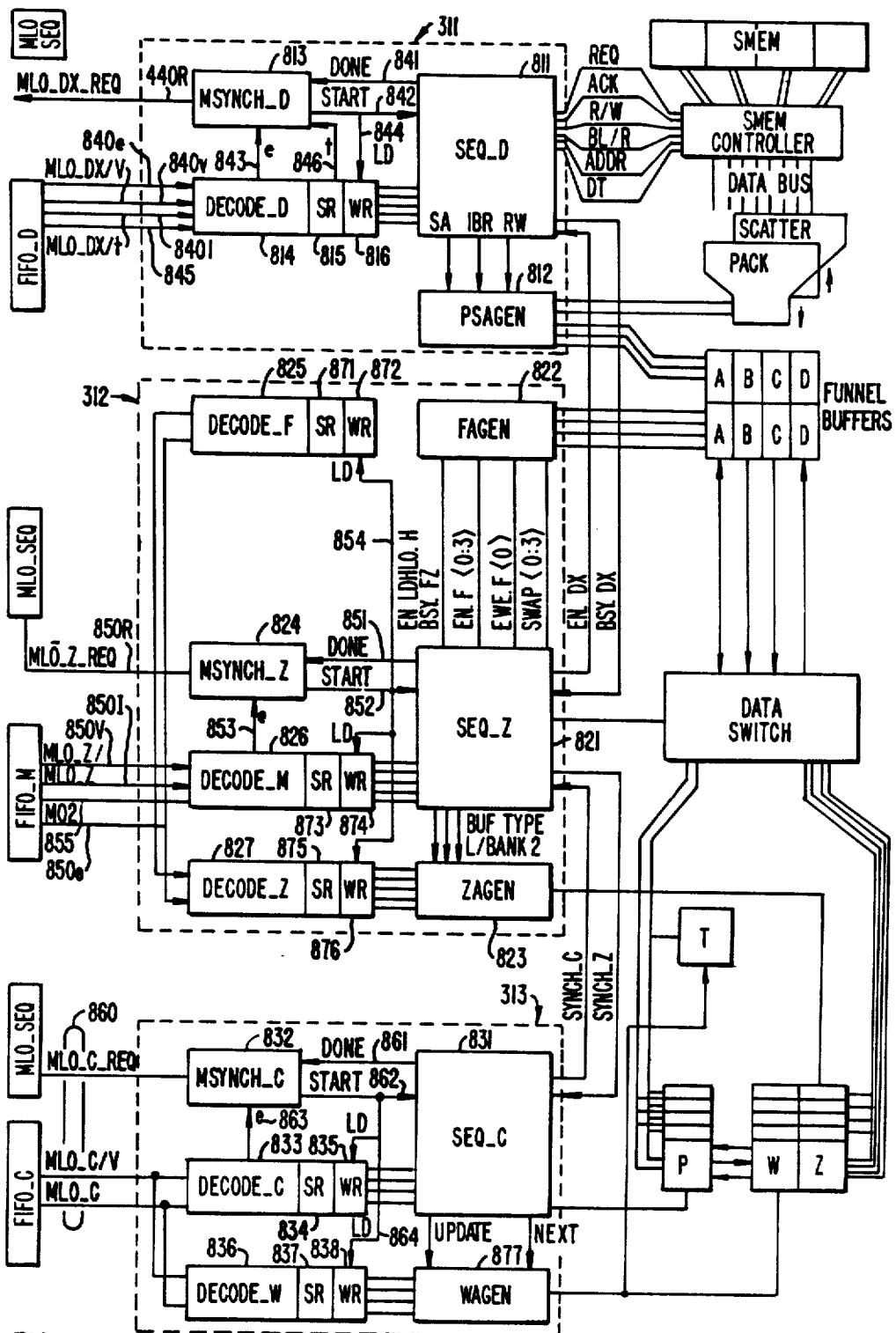
FIG._14.

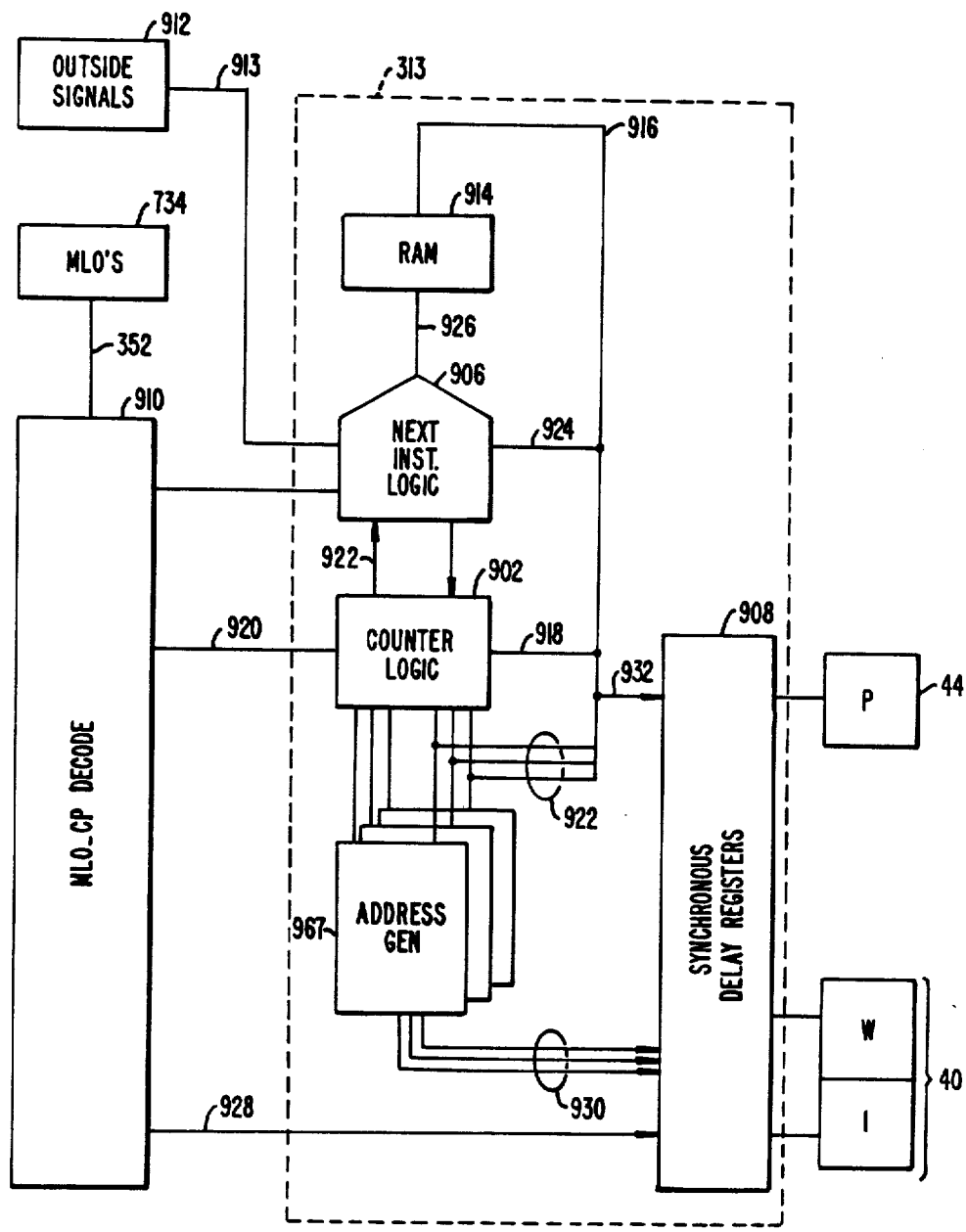
FIG._15.

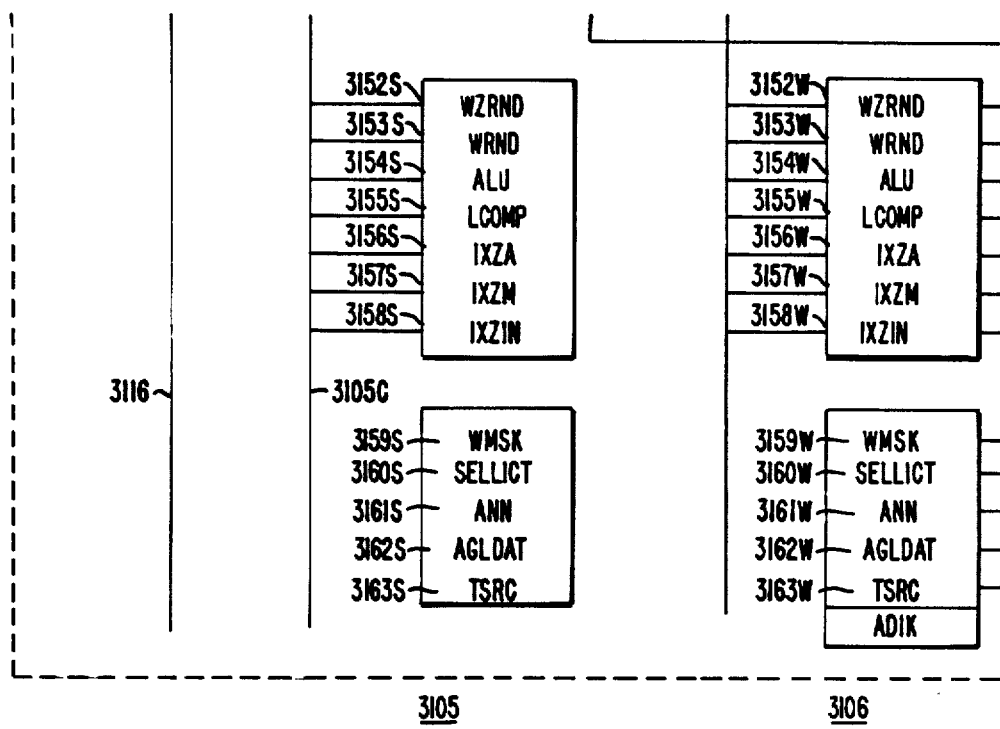
FIG._16C.
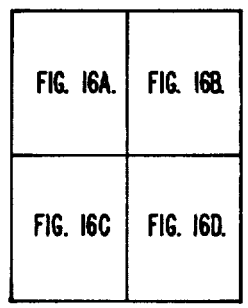
FIG._16.

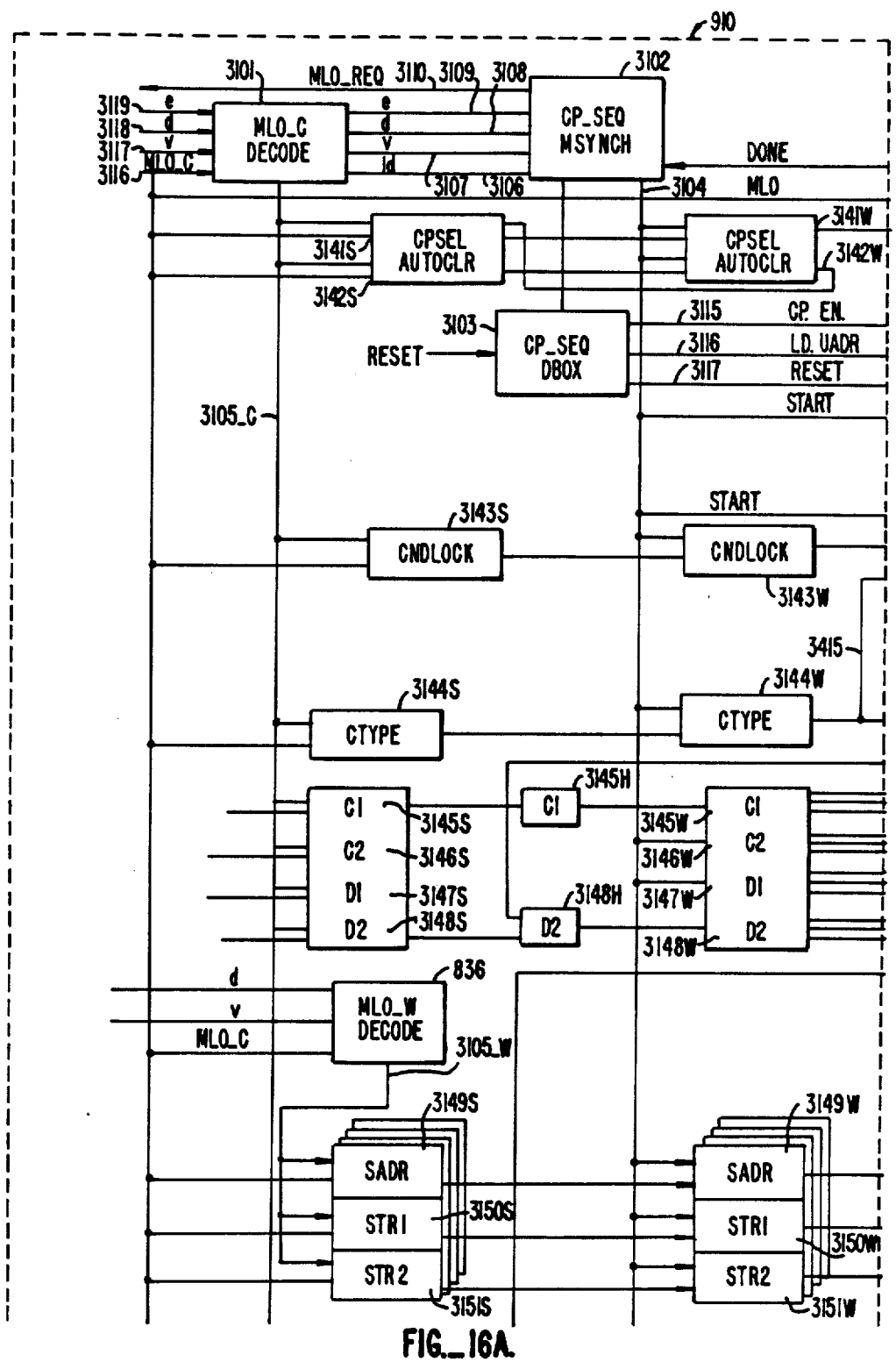
FIG.—16A.

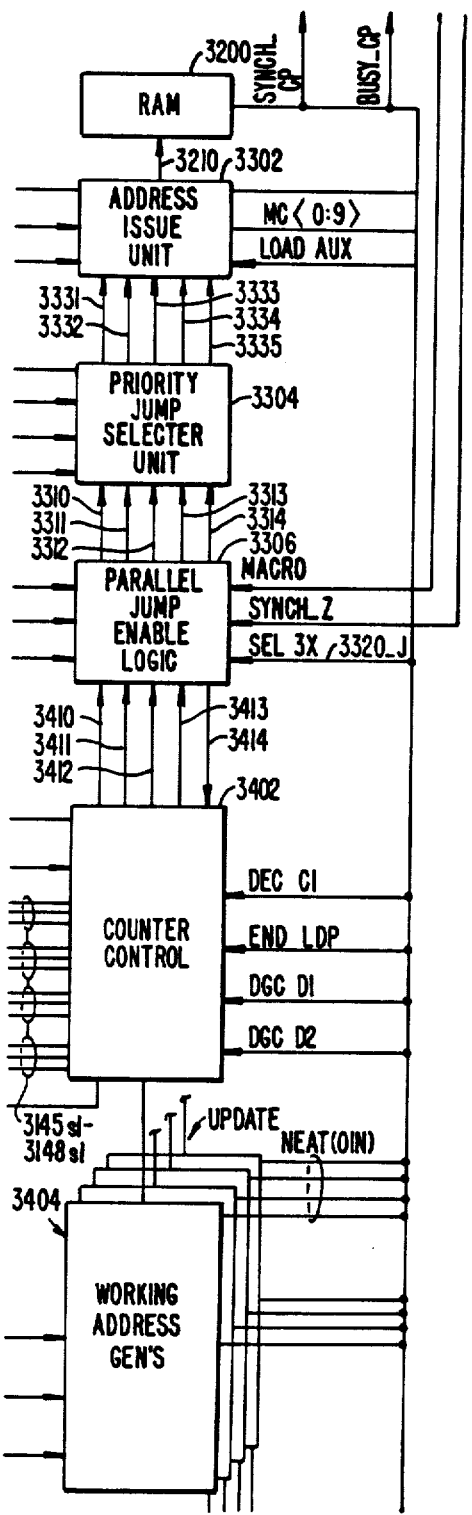

JC_I
SEL_I, C.O, SEL.-JC-I
LI, SE4-JI-2
LL! (OCP)

JUMP
ADC (OLD)
LOAD ADC
JUMPD (OFC)
JUMP4
JUMPB ⟨OFC⟩
JUMPA ⟨OFC⟩

COLLISION CONT
DECCNTR

FIELD
SELMUX⟨OLD⟩
COMLLA ⟨OLD⟩
BUSY CP
SYNCIL
EN MUX.T
OW. ALU
C_E STAT
SENDSTAT

DATA PATH CONT
DEL. SAC
E. SMC
LOAD. ROUR
EN. PA(1)
EN. PA(0)

ZONE PSDC CONT
ML. SEG (OLD)
ML. SEL
LOAD. ML
LOAD. ALU
LOAD. A-M
LOAD. AL2
LOAD. AL3
AL.SAC
AB.SAC
PALU (0:D)
WAMP
LCOMP(0:D)

WAG CONT
CMPLE
BA. SAC
GEN. SRC
EN. BANA
EN. BAN+1

ZONE MEM CON-
EN. SM
BAC
BMC
BINE
CO S4
LOAD ZONE

FIG._16B.

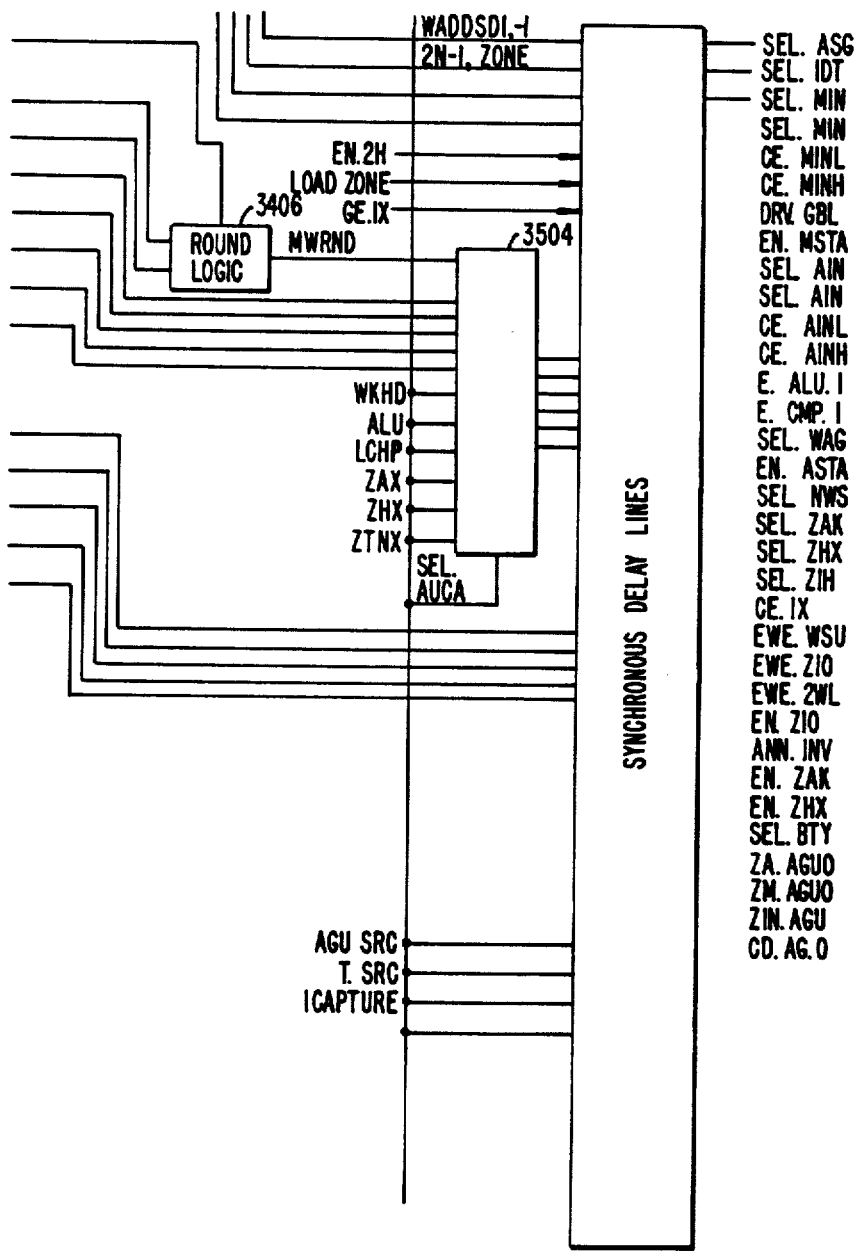
FIG._16D.

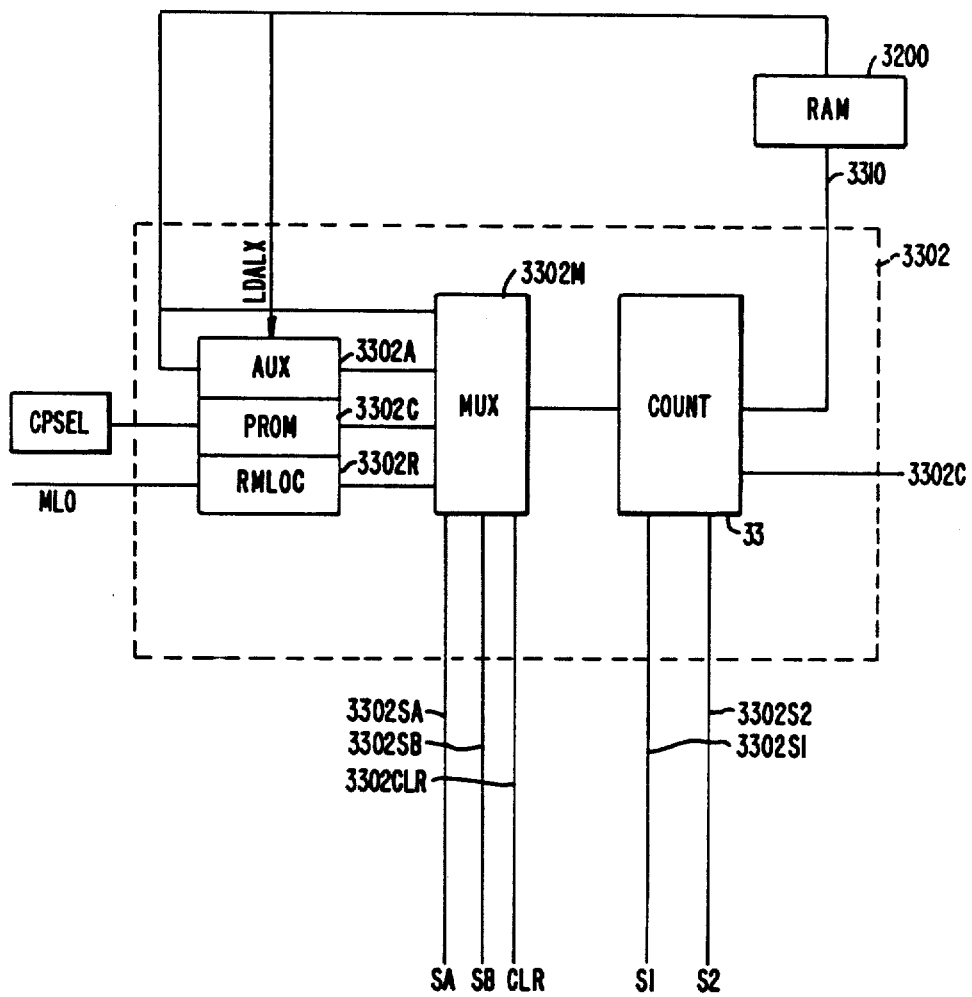
FIG._17.

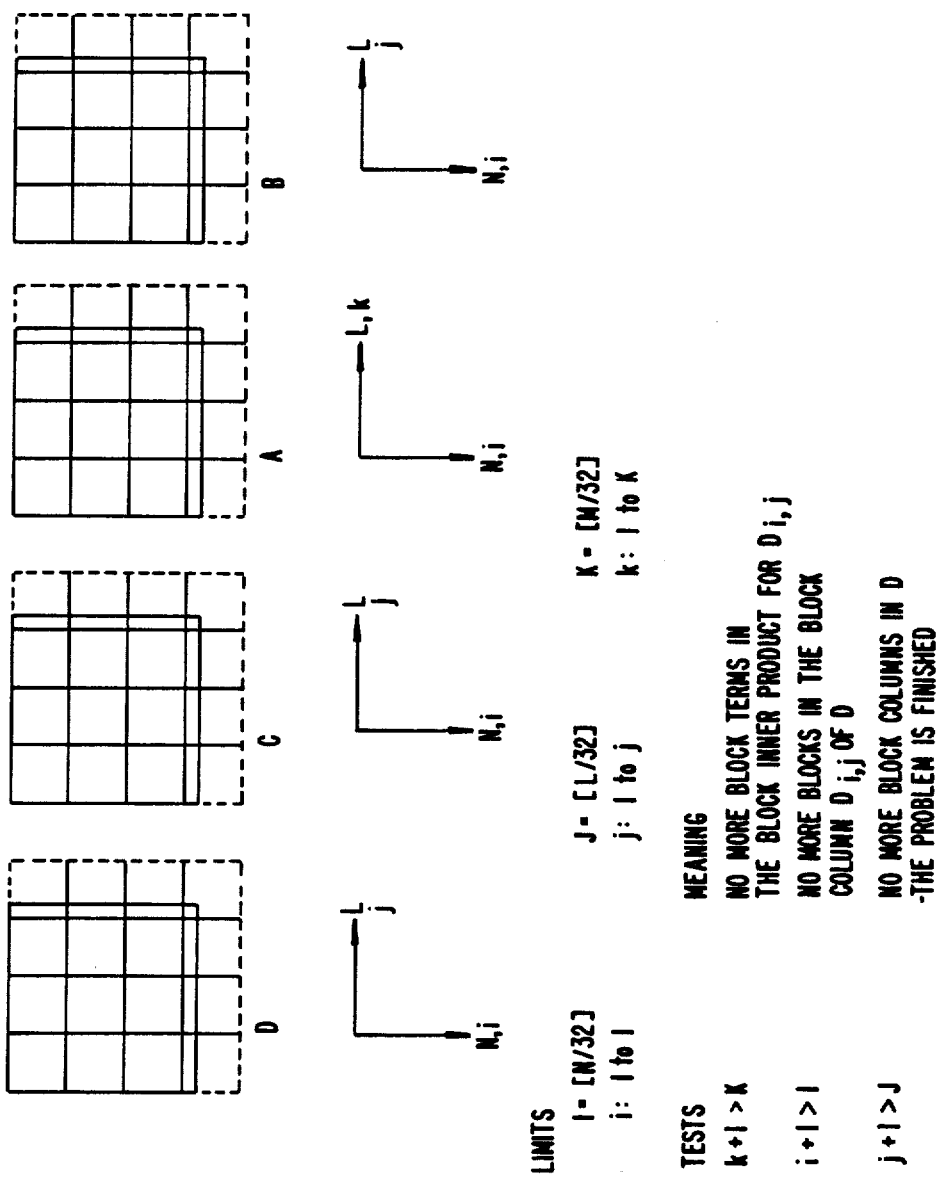
FIG._18.

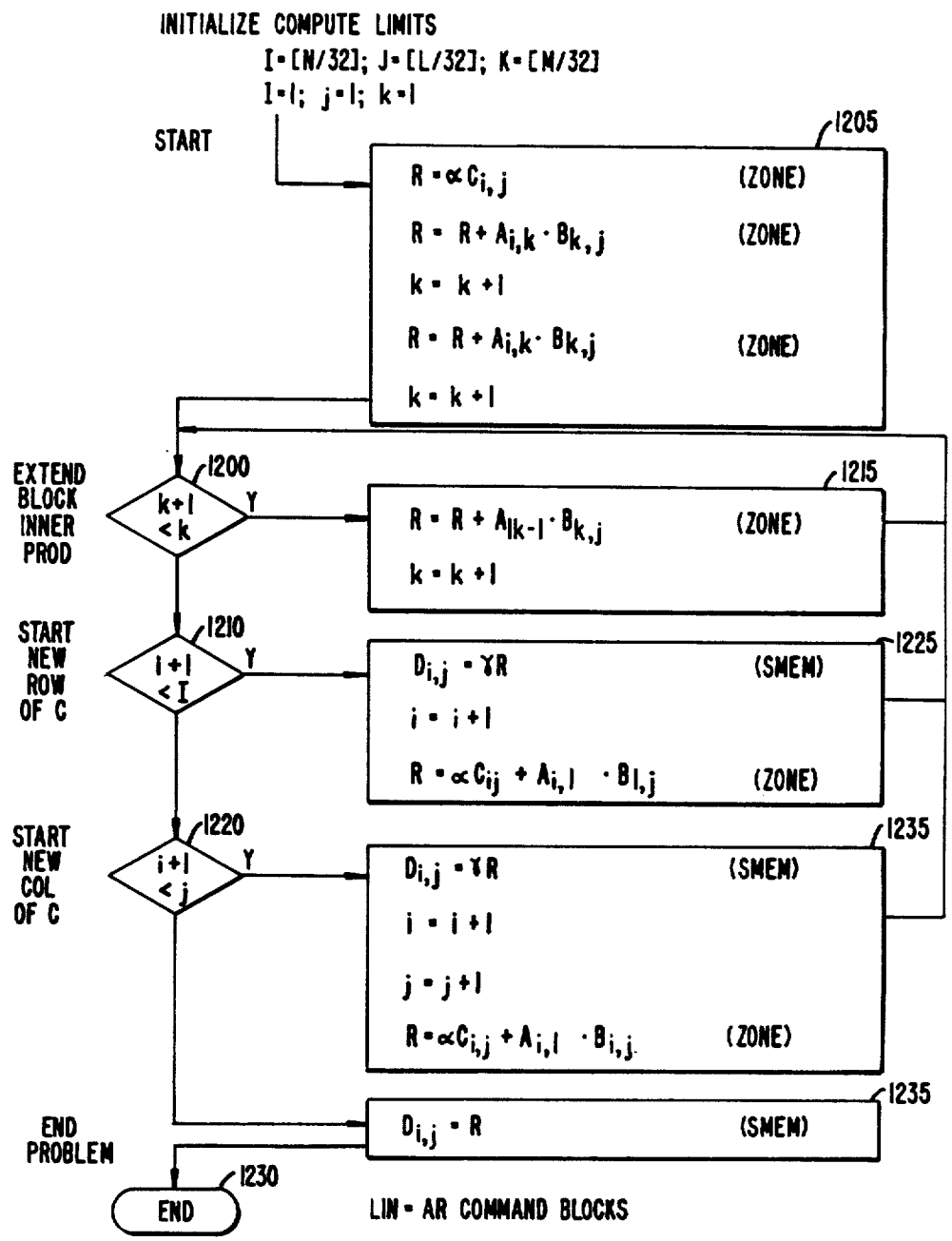
FIG._19.
ALGORITHM FRAMEWORK

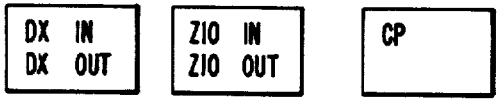
(FINAL S TO F, F TO Z, CP, Z TO F, F TO S)
(FINAL F TO Z, CP, Z TO F, F TO S)
(FINAL CP, Z TO F, F TO S)
(FINAL Z TO F, F TO S)
(FINAL Z TO F)
FIG_20.
FULLY INTERLOCKED MLO SLICES (2 OF 2)

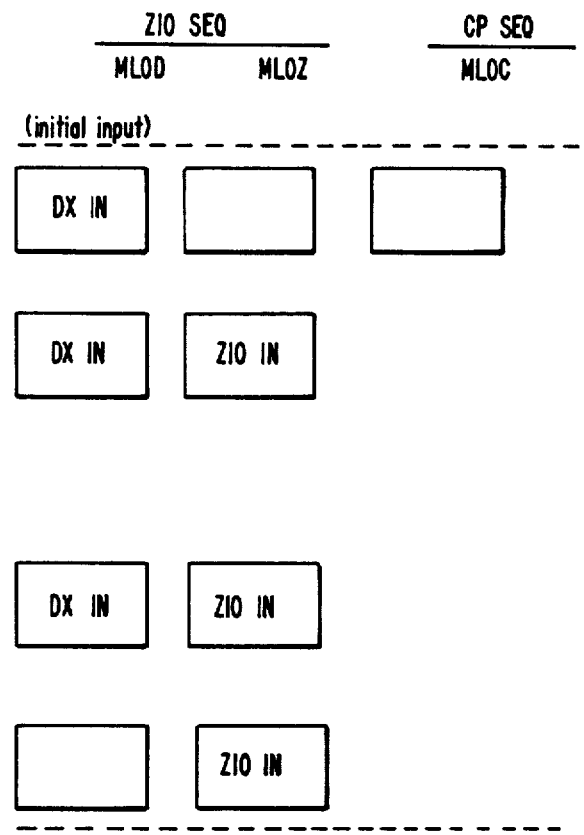
FIG.—20b.

ARCHITECTURE FOR BLOCK PROCESSING COMPUTER SYSTEM

BACKGROUND OF THE INVENTION

This invention relates generally to high speed computing systems, and, more particularly, it relates to a computing system architecture for decomposing mathematical operations into a series of block operations on discrete blocks of data, and for performing those block operations with a block processor by supplying and removing blocks of data to and from the block processor.

Certain classes of mathematical problems require high speed computers for their solution to be useful. For example, a complex weather forecasting program is only useful if it produces predictions for a particular day before that day has come and gone. Similarly, applications such as film animation and seismic exploration also require high speed computing power to complete their task in a useful time period.

Higher computing speeds have been approached in a variety of ways, such as faster semiconductor technology and the use of multiple processors in a parallel or pipelined configuration. In pipelined architectures, for example, an operation is divided into several stages and a sequence of relatively simple operations is performed on long vectors of data. Partial processors achieve increases in speed by simultaneously performing the same operation on different data elements.

While the availability of relatively low cost processing elements has made such multiple-processor architectures possible, the overall speed of the computing system is limited by the speed with which data stored in main memory can be supplied to and retrieved from the processors. In the prior art, methods for local storage of data (buffer memories), pipelining the transmission of data from memory, and double buffering of data have been developed, but, as processor speeds increase, the "I/O bottleneck" remains.

In the mathematical arts, various methods of problem decomposition have been developed for decomposing an operation on large arrays of data into an equivalent sequence of operations on smaller discrete blocks of data. What is needed is a computing system architecture which supports the use of block decomposition algorithms in multiprocessor systems by supplying and removing blocks of data to and from the processing elements at a speed which allows the processors to operate virtually continuously.

SUMMARY OF THE INVENTION

According to the invention, a computing system is provided for performing externally-specified mathematic operations on externally-specified subarrays stored in a system memory. A decomposition and control unit decomposes the operation into a series of block operations on computational blocks of data and generates control and address signals to access the computational blocks and perform the block operations on the blocks of data. Alignment means are provided for selecting the data in the computational blocks from data accessed from the system memory in burst mode. The selected computational blocks are transferred to a block processor and result blocks are transferred to the system memory. The block processor includes a parallel set of pipelined processors and its own local memory for storing computational blocks of data.

In a preferred embodiment, the decomposition and control means comprise distinct decomposition means and control means. The decomposition means performs the problem decomposition and transmits machine level instructions to the control means. The control means comprises three controllers, each of which receives a particular type of machine level instruction and controls a particular part of the system.

In this embodiment, a macropipeline is provided for selectively coupling the output of the alignment means to the block processor. The macropipline includes a set of funnel buffers for temporarily storing blocks of data and switching means for controllably transferring data from a funnel buffer to another funnel buffer or to the block processor. The block processor has an interchangeably double-buffered local memory for receiving or sending computational blocks of data while it performs block operations on other blocks.

The invention thus uniquely supports the use of block processing algorithms and parallel pipelines processors by supplying and removing discrete blocks of data to and from the block processor at a rate which allows the processors to operate virtually continuously.

BRIEF DESCRIPTION OF THE DRAWINGS

FIG. 1 is a block diagram of a computer system according to the preferred embodiment of the invention.

FIG. 2 is a block diagram of the block processor of FIG. 1.

FIG. 3 is a block diagram of the system memory and data block path of FIG. 1.

FIG. 4 is a conceptual diagram illustrating the operation of the alignment means of FIG. 3.

FIG. 5 is a block diagram of the internal structure of the macropipeline of FIG. 3.

FIG. 6 is a block diagram of structure of the funnel buffers of FIG. 5.

FIG. 7 is a block diagram of the decomposition and control means of FIG. 1.

FIG. 8 is a block diagram showing details of the block decomposer of FIG. 7.

FIG. 9 is a conceptual representation illustrating the operation of the blocking command forming modules of FIG. 8.

FIGS. 10-12 show the operation of typical zone I/O command forming modules.

FIG. 13 is a block diagram of the control and address signal generator of FIG. 7.

FIG. 14 is a detailed block diagram of the controllers of FIG. 13.

FIG. 15 is a conceptual diagram of the processor controller of FIG. 14.

FIG. 16 is a detailed block diagram of the processor controller of FIG. 14.

FIG. 17 is a block diagram of the address issue unit of FIG. 16.

FIGS. 18, 19, 20a and 20b illustrate the operation of the control hierarchy of the invention.

DESCRIPTION OF THE PREFERRED EMBODIMENT

FIG. 1 is a functional block diagram of a block processing computer system 10 for processing command packets issued by general purpose computer 12, in accordance with one embodiment of the invention. Block processing computer system 10 includes: a system memory (SMEM) 14 coupled to one side of a data block path 16; block processing means 18 coupled to the other side of data block path 16; and decomposition and control means 20 coupled to computer 12, SMEM 14, data block path 16, and block processor 18.

General purpose computer 12 issues command packets specifying mathematical operations on subarrays of an array of data stored in SMEM 14. The data is typically stored in SMEM 14 as addressable "words" of binary digits. The subarrays specified by the command packet may be of any size, and the elements of the specified subarray are not necessarily contiguous elements of the stored array.

The command packet issued by computer 12 is transmitted to decomposition and control means 20 via command bus 22. Decomposition and control means 20 decompose the specified mathematical operation into a series of block operations on discrete computational blocks of data words, according to block decomposition algorithms known in the mathematical arts. The computational blocks have a finite maximum size which is determined by the capacity of block processing means 18. Decomposition and control means 20 generates control and address signals and transmits these signals on control and address lines 24, 26, and 28 to move computational blocks of data words from SMEM 14 via data bus 30 to data block path 16, from data block path 16, via bus 32, to selected storage locations in block processor 18. The generated control and address signals on lines 28 also control and configure block processor 18 to perform a block operation on a computational block to produce a result block of data words, to move the result block along data block path 16, and to store the result block in designated locations in SMEM 14. In this manner, the series of block operations on computational blocks of data words is performed, resulting in the accomplishment of the mathematical operation specified by the command packet issued by general purpose computer 10.

Block processing means 18 is a specialized processor for performing block operations on computational blocks of a predetermined maximum discrete size, in response to control and address signals received from decomposition and control means 20. Referring to FIG. 2, the block processing means 18 of this embodiment includes block storage means 40 for storing at least one computational block of data, and a set of 32 vector processors 42 for processing one-dimensional vectors of data words in a pipelined manner. In this embodiment, the maximum size of a computational block is 32×4,000 words. Block storage means 40 comprises 32 zone buffers. Each zone buffer 46 is advantageously a double buffer, comprising a working side buffer 48 and an I/O side buffer 50. Each processor 44 is bidirectionally coupled to the working side of a corresponding zone buffer for reading and writing data in a computational block during a block operation. The I/O side buffers 50 are coupled to the data block path via preload paths 52 and unload paths 54 for receiving and sending computational blocks of data while the processors are operating on the computational block stored in the working side buffers. The I/O side buffers and the working side buffers are interchangeable between block operations.

Block processor 18 also has a global bus 56 coupled to all of the vector processors for directly inputting common data from the data block path to the processors. Control and address signals are received via lines 28.

Details of the structure and operation of a block processor suitable for this embodiment are discussed in copending commonly assigned patent application titled "Multizone Processor" Ser. No. 784,922, filed Oct. 4, 1985, the disclosure of which is hereby incorporated by reference.

Referring to FIG. 3, details of the structure of the system memory (SMEM) 14 and data block path 16 are shown. System memory 14 comprises a plurality of local memories 60 (four, in this embodiment) for providing a high memory capacity, and a synchronous data buffer 62 coupled to each local memory. A system memory controller 63 is coupled to each local memory 60 and to synchoronous data buffer 62. A read request for a single address will address the four words at that address, one from each local memory. Synchronous data buffer 62 concatenates the four words transmitted on local memory busses 64 to form a single "wide word" for transmission on the system bus (SBUS) 30. A wide word can be produced in each memory clock cycle.

To facilitate the high speed movement of data blocks for block processing, the system memory 14 supports a burst access mode whereby all of the data words stored in the memory location beginning at a specified starting address, and continuing for a predetermined burst length, are read from the memory in response to a single read request. This burst mode typically operates considerably faster than the time required to access the same data one word at a time. However, because the data words in the specified subarray (and in the defined computational blocks) are not necessarily stored in adjacent memory locations, the data retrieved in burst access mode will generally include unwanted data words which are stored adjacent to the desired data words. To take advantage of the burst access mode, the data block path 16 of the preferred embodiment therefore includes alignment means 70 for selecting the data words in the defined computational block from the words on SBUS 30.

The alignment means 70 are controlled by signals received from decomposition and control means 20 via line 72. The detailed structure and operation of alignment means 70 is described in copending patent application titled "Data Alignment System", inventor Robert L. Papenberg, the disclosure of which is hereby incorporated by reference.

The general operation of the alignment means 70 is illustrated in FIG. 4. The data words $W_1-W_9$ are stored in SMEM local memories A, B, C, and D as shown. (In this embodiment, the data words in the local memories are 64 bits wide and the words in the computational blocks are 32 bits wide). Words $W_1-W_3$ form a column of the desired two-dimensional computational block, and words $W_4$ and $W_7$ start new columns.

A first burst transfer results in the transfer of all of the data at addresses $A_1-A_5$ being transmitted onto the local busses 64 to the synchronous data buffer 62. At each memory clock cycle, synchronous data buffer 62 concatenates four 64 bit local memory words to form a wide word (256 bits in this embodiment of the invention). The wide words are transmitted on SBUS 30 to alignment means 70. A second burst transfer reads data from addresses $A_{11}-A_{15}$, and a third burst transfer reads data from addreses $A_{21}-A_{25}$. Synchronous data buffer 62 forms 15 wide words for transmission on SBUS 30. The data on SBUS 30 includes the desired data words $W_1-W_9$ intermixed with other (unwanted) data.

The data alignment means 70 receives the SBUS data and selects the desired data words $W_1$-$W_9$ during SBUS clock cycles 1-12 to form a computational block of, in this example, nine 32 bit words. The alignment means 70 and synchronous data buffer 62 also operate in the reverse direction to scatter words from a result block into selected SMEM locations.

The data selected by the alignment means may be transferred directly to block processing means 18 where it is stored in selected storage locations. In the preferred embodiment, as shown in FIG. 3, the data block path includes macropipeline means 74 for controllably coupling alignment means 70 to block processing means 18. Macropipeline 74 deals entirely with computational blocks of data.

The macropipeline is a routing and staging area for computational blocks of data. In response to control and address signals received on lines 75, it routes blocks of data to and from the various internal data lines of the block processor and provides additional functions of transposing a two-dimensional block of data, reversing the order of a linear block of data, or extracting a block of data from one SMEM subarray and then placing it back within another SMEM subarray without using it in the block processor. Data blocks can also be shuffled back and forth between the block processor and the macropipeline several times, or held for an indefinite period within the macropipeline. In the preferred embodiment, the macropipeline includes funnel buffers for holding blocks of data, enabling the SMEM-to-macropipeline data transfers to operate at a different clock rate than macropipeline-to-block processor transfers.

As shown in FIG. 3, the macropipeline is connected to the alignment means by packed data line 76, over which packed data blocks can flow in either direction. The macropipeline couples data from the alignment means to the following lines of the block processor:

(a) block processor preload lines 52 which preload blocks of data into the I/O side of the double-buffered zone memory;

(b) block processor post unload lines 54 which extract completed blocks of result data from the I/O side of the doublebuffered zone memory;

(c) block processor direct access lines 56 which provide data directly to the zone processing elements and/or remove blocks of data from systolic computations.

The internal structure of the macropipeline is shown in FIG. 5. Macropipeline 74 comprises an SMEM side interconnect 610, a plurality of dual-ported funnel buffers 630, a zone buffer to funnel interconnect 640, a direct path interconnect 650, a zone buffer crossbar 660, and a direct access path crossbar 670. Macropipeline 74 receives control and address signals from decomposition and control means 20 via lines 74 (FIG. 3), shown in FIG. 5 as lines 292, 294, and 296.

SMEM side interconnect 610 receives computational data blocks or sends them back to the alignment means via packed data line 76. At any time, it may input or output a computational data block that is communicated via line 76 to one of the funnel buffers via a local SMEM side data bus 611. If the data is being written into a funnel buffer, the write-enable line 612 to that funnel buffer is activated and, as the elements of the data block are input, the addresses on the local address line 613 determine the exact storage location within the funnel buffer. Input control to SMEM interconnect 610 is provided by buffer select lines 614, which select one or more of the funnel buffers to receive incoming data from the packed data line 76. If output from the funnel buffers is desired, buffer select lines 614 will select one funnel buffer to provide data which will then flow through SMEM interconnect 610 to the packed data line 76.

SMEM interconnect 610 also receives an SMEM side write-enable signal on line 615. Data proceeds at only one direction at a time over packed data line 76. If the SMEM side write-enable signal on line 615 is valid, funnel buffers are being written into with data from the SMEM. If the write-enable signal on line 615 is not valid, then one of the funnel buffers 630 is providing data which flows out over local data bus 611, through SMEM interconnect 610, and out through packed data bus 76 to the alignment means. SMEM side interconnect 610 also receives an address over line 616 which is connected to one or more of the local address lines 613, according to the valid bits of the buffer select line 614, for addressing the appropriate locations of the funnel buffers 630 for reading or writing data.

On the other side, switching means controllably couple the funnel buffers to the block processor. Each funnel buffer 630 is connected either to direct path interconnect 650 or zone buffer interconnect 640. Each funnel buffer connected to zone buffer interconnect 640 has a local funnel buffer data line 641, a local write-enable line 642, a local address control 643, and a local SWAP 644. Zone buffer interconnect 640 receives path select signals over control lines 645 which determine whether the data from each funnel buffer is fed through interconnect 640 to zone buffer crossbar 660, or whether it is fed from one of the funnel buffers to another. Zone buffer interconnect 640 also receives: write-enable signals on lines 646, one for each funnel buffer, which is appropriately routed according to the path select signals on path select signal lines 645; a swap signal on line 648, which is connected to each attached funnel buffer; and an address control signal on line 647, which is connected to each attached funnel buffer.

Direct path interconnect 650 is similar to zone buffer interconnect 640. It also is connected to a plurality of dual-ported funnel buffers, whose other ports are connected to SMEM interconnect 610. As is the case with zone buffer interconnect 640, direct path interconnect 650 has, for each funnel buffer, a local funnel buffer data line 651, a local write-enable line 652, local address control line 653, and a local SWAP line 654.

The interconnect controls for direct path interconnect 650 are similar to the controls for zone buffer interconnect 640. These controls comprise: a path select signal on line 655, which selects paths between funnel buffers, and from funnel buffers to the direct path crossbar 670; a write-enable signal on line 656, with one bit which is distributed to each funnel buffer which is connected to direct path interconnect 650; and a SWAP bit on line 658, which is connected to each attached funnel buffer; and address control signal on line 657 which is connected to each attached funnel buffer. One of the funnel buffers 630(A) is connected to both zone buffer interconnect 640 and to direct path interconnect 650 via an inter-tie bus 620. Direct path interconnect 650 and a direct path crossbar 670 are connected by a plurality of direct path inter-ties 671, 672, 673, one of which carries data from each funnel buffer which is connected to direct path interconnect 650, including an interconnect line 673 which carries data from the zone inter-tie bus 620. Thus, in the embodiment shown in FIG. 5, S buffer inter-tie 671 carries data between the funnel buffer designated "S" and various processor direct paths 56 via the direct path interconnect 650 and direct path crossbar 670; data passing from the T funnel buffer designated to the block processor direct paths 56 passes over the T path intertie 672, and data passing between the A funnel buffer and the direct paths 56 passes over the AP direct path inter-tie 673.

Direct path crossbar 670 provides for the connection of any one of the direct path inter-ties 671, 672, 673 to any one of the direct paths 56. Control of direct path crossbar 670 is provided by a multibit crossbar selection signal on line 675.

In the zone path crossbar 660, data passes between that crossbar 660 and funnel buffers 630(A), 630(B), 630(C) and 630(D) via zone buffer inter-tie AB 661, zone buffer inter-tie D 664. These four inter-ties provide data to and from the funnel buffers, A, B, C, and D, respectively. The zone buffer crossbar provides connection from the four inter-ties 661 through 664 and the zone buffer I/O side preload lines 52 and post unload line 54. In the embodiment shown here, a total of sixteen crossbar connections are possible, and control of the crossbar network is provided by a multibit crossbar control signal 665.

The details of an embodiment of the dual-ported funnel buffers are shown in FIG. 6. The A funnel buffer is shown as an example, but the description applies to each funnel buffer in FIG. 5. Each funnel buffer comprises a zero-bank RAM 336 and a one-bank RAM 338, coupled to a funnel buffer control unit 633. Control unit 633 switches the data and write-enable paths of each RAM so that one RAM is connected to the SMEM side interconnect when the other RAM is connected either to the direct path interconnect 670 (for the S&T funnel buffers) or the zone buffer funnel interconnect 640 (for the A, B, C, and D funnel buffers). Control unit 633 receives SWAP signals on line 644 from the zone buffer interconnect or SWAP signals on line 654 from the direct path interconnect for swapping the zero and one RAMs.

Funnel buffer control unit 633 comprises two multiplexers (MUXes) 634 and 635 and address generator 636. Control unit 633 receives data, write-enable, and addresses signals from the SMEM side interconnect via data line 611, write-enable line 612, and address line 613. These signals are directed to either AO RAM 336 or Al RAM 338 via AO MUX 634 and Al MUX 635, which receive a select signal in common from the SWAP signal line 644, causing both MUXes to switch, thereby providing the data, write-enable, and address signals either to AO RAM 336 or to Al RAM 338. Data and write-enable signals also come from zone interconnect 640 via data line 641 and write-enable line 642. These signals are connected to the other option of the two MUXes, the AO MUX 634 and the Al MUX 635, in such a way that when AO RAM 336 is receiving data and write-enable signals from the SMEM side interconnect 610, Al RAM 338 is receiving data and write-enable signals from zone buffer interconnect 640.

Conversely, the Al RAM 338 may be connected for data and write-enable signals to SMEM side interconnect 610 while the AO RAM 631 is connected to zone interconnect 640. Addresses for the RAM which is connected to zone interconnect 640 are provided by funnel to zone address-generator 636 rather than directly from zone interconnect 640. Zone interconnect 640 provides funnel to zone address generator 636 with the starting address within the funnel buffer, the number of rows, the number of columns, and whether the access is to be matrix or linear; if matrix, whether it is to be transposed or nontransposed, and if linear, whether it is to be forward or reverse. This address control information comes from zone interconnect 640 over address control lines 643 to the funnel-to-zone address generator 636. Funnel-to-zone address generator 636, via its own internal counters and logic, produces a sequence of individual element addresses on address line 637, which then is switched via either AO MUX 634 or Al MUX 635 to AO RAM 336 or Al RAM 338, respectively, to provide reading or writing addresses for ecah individual element of any data block that is to be transferred to or from the funnel buffer via zone interconnect 640.

The structure and operation of the decomposition and control means will now be described in detail. Referring to FIG. 7, the decomposition and control means 20 of the preferred embodiment comprises block decomposition means 100, coupled to control and address signal generating means 102 via busses 104.

In response to command packets arriving on command bus 22, block decomposition means 100 decomposes the externally-specified mathematical operation into a time-multiplexed hierarchy of data block movements and computations, generating machine level operation signals (MLO fields) for transmission via MLO busses 104 to control and address signal generator 102. The MLO fields generated by decomposition means 100 specify where each computational block of data is to come from in an SMEM array, how each block moves along the data block path, and what computation is performed upon the computational block. The specification is at a high level; the detailed control of switches and gates is specified by control and address signal generator 102, which provides complete synchronized control for the movement of every element of data and the computations performed on the data elements.

The structure of block decomposition means 100 of this embodiment will now be described in detail with reference to FIG. 8.

Decomposition means 100 comprises the CDX structure 710, block algorithm frame templates 712, linear command templates 714, and command forming modules. Three classes of command forming modules are shown in the drawing—the blocking modules 720, the zone I/O modules 722, and the compute modules 724. Three FIFOs (first-in-first-out stacks) are provided for holding MLO fields: MLO-D FIFO 730, the MLO-Z FIFO 732, and the MLO-C FIFO 734. A status reporting network includes MLO status FIFO 736, status reporting module 738, and command status FIFO 740. Modules and registers which are used in the interpretation and validation of primitive command packets and loading CDX registers include the command FIFO 750, primitive staging register 751, loader module 752, primitive dictionary 753, validation modules 754, build CDX modules 755, validation template 756, and CDX build template 757.

The operation of decomposer 100 is initiated when a primitive command packet is received from the general purpose computer and enters the command FIFO 750. When the primitive block decomposer is ready for a primitive, it reads the command FIFO into the primitive staging register 751, via command FIFO output line 760A.

Primitive staging register 751 holds four control words followed by room for six full subarray specifications. Its format is given in Table I.

The identification field of the primitive command provides a primitive identification signal 762 to the primitive dictionary 753. If the identification signal 762 indicates a new primitive is to be loaded, the dictionary 753 supplies a load command 766 to the loader module 752, which then reads primitive staging register 751 and breaks the load signal 768 into its appropriate parts; it then provides a new template load signal 771, which loads new validation templates 756, CDX build templates 757, linear command templates 714, a block algorithm frame template 712, and a new entry 771A in the primitive dictionary. This template-based structure provides ease of programmability of the primitive block decomposer when new algorithms are added.

If primitive dictionary 753 indicates that an existing primitive is to be activated, primitive dictionary 753 points to the appropriate validation template 756 through a template continuation pointer 770A. The validation template for that primitive indicates which validation checks are to be performed upon the data specifications within the primitive command packet via a signal 754A for activating the appropriate validation module 754. Errors are reported via error signals 772 to the status reporting module 738, which forwards status information signals 739 to status FIFO 740. Error signals from the control and address signal generator are also forwarded from MLO status FIFO 736 as MLO status signals on line 737. If no errors occur, the validation template, when finished, supplies the appropriate pointer 770B to the CDX build template 757.

CDX build template 757 activates appropriate build CDX modules 755 via a signal 755A, which translate the data description parameters of the primitive command packet, as given in Table II, into a standard format, which is optimized for the efficient production of single block DX MLOs, and stores them in the compound data transfer (CDX) register structure 710.

CDX register structure 710 has one entry for each of the six possible parameters. For each parameter the CDX structure, which is shown in Table III, represents the six-dimensional array as a set of six dimensions, and six gap lengths. The gap length is the number of physical SMEM short words between each element and the next along that dimension. Ordering is considered in creating the CDX entry for each parameter. If all six parameters of a primitive are not specified, the corresponding entries in the CDX table are not used. A CDX entry, if used, is always fully specified. Those dimensions which are not defined by the primitive are given default values. All arrays are treated identically by the routines driving the CDX input and output. Therefore, CDX dimensions are reordered in the sequence given by the order vector, i.e., if ord(n)=k, then dimension k of the subarray indicated in the primitive staging register is the nth dimension indicated in the CDX register. When the CDX build template is through, it supplies a pointer 770C to the appropriate block algorithm frame template.

The block algorithm frame template contains all of the decisions of the particular block algorithm for the execution of this primitive. It may require array dimension parameters 789 from the compound CDX register 710 to provide limits on the number of blocks which are used in each direction. The block algorithm frame template contains counters for the number of blocks in each direction in a multi-dimensional array, decisions of which block to use next, and pointers.

TABLE I

Primitive Staging Area

| WORD | | CONTENTS |
|---|---|---|
| WORD | 0 | PRIMITIVE FUNCTION IDENTIFIER |
| WORD | 1 | THIS PID |
| WORD | 2 | NUMBER OF WORDS |
| WORD | 3 | NUMBER OF PARAMETER DESCRIPTIONS |
| WORDs | 4   1F | PARAMETER 0 DESCRIPTOR |
| WORDs | 20  3B | PARAMETER 1 DESCRIPTOR |
| WORDs | 3C  57 | PARAMETER 2 DESCRIPTOR |
| WORDs | 58  73 | PARAMETER 3 DESCRIPTOR |
| WORDs | 74  8F | PARAMETER 4 DESCRIPTOR |
| WORDs | 90  AB | PARAMETER 5 DESCRIPTOR |

TABLE II

Data Description in the Primitive Staging Register

| WORD | | ENTRY |
|---|---|---|
| WORD | 0 | ord[0] — ord[3] |
| WORD | 1 | ord[4] — ord[5], S.R.P.#DIM |
| WORDs | 2   7 | dim[0] — dim[5] |
| WORDs | 8   0D | subdim[0] — subdim[5] |
| WORDs | 0E  13 | suboff[0] — suboff[5] |
| WORDs | 14  19 | substride[0] — substride[5] |
| WORDs | 1A  1B | SA | where the meanings of the entries are:
ord() = an element of the dimension ordering vector
S = Subarray Indicator
R = Real/Complex Indicator
P = Precision Indicator
DIMs = number of dimensions in array
• if = 0, array is null
• if = 1, array is scalar
dim[η] = ηth dimension of parent array
suboff[η] = offset of ηth dimension of subarray within the ηth dimension of the parent array
substride[η] = number of elements of parent array in ηth dimension per single ηth dimension subarray element
SA = starting address of array in SMEM

TABLE III

Structure of a Single Parameter in the CDX Register

| | | | | |
|---|---|---|---|---|
| CTRL | RESERVED | RESERVED | CGAP H | CGAP L |
| | CADR HIGH | CADR LOW | RESERVED | RESERVED |
| DIM 0 | EXTENT | COUNTER | GAP HIGH | GAP LOW |
| | ADRS HIGH | ADRS LOW | RESERVED | RESERVED |
| DIM 1 | EXTENT | COUNTER | GAP HIGH | GAP LOW |
| | ADRS HIGH | ADRS LOW | RESERVED | RESERVED |
| DIM 2 | EXTENT | COUNTER | GAP HIGH | GAP LOW |
| | ADRS HIGH | ADRS LOW | RESERVED | RESERVED |
| DIM 3 | EXTENT | COUNTER | GAP HIGH | GAP LOW |
| | ADRS HIGH | ADRS LOW | RESERVED | RESERVED |
| DIM 4 | EXTENT | COUNTER | GAP HIGH | GAP LOW |
| | ADRS HIGH | ADRS LOW | RESERVED | RESERVED |
| DIM 5 | EXTENT | COUNTER | GAP HIGH | GAP LOW |

TABLE III-continued

Structure of a Single Parameter in the CDX Register

| ADRS HIGH | ADRS LOW | RESERVED | RESERVED |
| --- | --- | --- | --- | where the meanings of the table entries are:
> CADR HIGH, CADR LOW are the high and low order bits of a control address, initialized to the starting address of the subarray.
> CGAP HIGH, CGAP LOW are the high and low bits of array control gaps. Varies with
• Complex = gap between real and imaginary parts of array
• Real = undefined
> EXTENT = dimension size of subarray
> COUNTER = dimension index of current block of subarray
> GAP HIGH, GAP-LOW = physical gap along dimension
> ADRS HIGH, ADRS LOW = starting address of current block in SMEM The pointers 770D are to linear command section templates.

Linear command section 714 is different from a block algorithm framework in that it contains no decisions, but rather a series of sequentially executed commands. These commands specify one or more block operations for each of the stages of the data block path. They also carry control and synchronization parameters to indicate groups of commands which specify a single block operation and synchronize the block operations in the various stages of the data block path.

Each command in a linear command section template activates a particular command-forming module exactly once. There are three classes of commands: the blocking commands, which activate the blocking modules 720; the ZIO commands, which activate the zone I/O modules 722; and the compute commands which activate the compute modules 724. Each of these command-forming modules generates MLO fields which specify machine level operations for a particular section of the system. Blocking modules 720 generate MLO-D fields for defining computational blocks and for specifying the transfer of data words between the SMEM and the macropipeline; zone I/O modules 722 generate MLO-Z fields for specifying the transfer of computational blocks between the macropipeline and the block processor; and compute modules 724 generate MLO-C fields for specifying block operations for the block processor. Each type of MLO field is transmitted to, and stored in, the corresponding MLO FIFO.

Each command contains a command identifier and may also contain a number of control parameters. Among the control parameters are the "block terminator" and the "lock" acronyms. The block terminator indicates that a block operation for that section of the system has been completely specified since the last block terminator. The linear command section communicates to the command-forming modules via command control lines 776A-776F to blocking modules 720, via control lines 777A-777F to zone I/O modules 722, and 778A-778F to compute modules 724. Each activation of a command-forming module results in the loading of one or more MLO fields into the MLO FIFOs. When a command-forming module is activated by a command containing a block terminator parameter, the last MLO field issued as a result of that command will contain an end-of-slice bit.

MLO fields are issued in groups called slices. A number of MLOs are placed into each FIFO with the last MLO field of the slice including an end-of-slice bit. The MLOs between end-of-slice bits specify all the aspects of an identifiable block process within one section of the system. The end-of-slice mark indicates that the specification of a particular block process is complete, and separates the specifications for that block process from the specifications of following block processes.

The MLO fields going to all three FIFOs (730, 732, and 734) are synchronized by additional interlock bits, which are called for by a "lock" acronym appended to a command. These interlock bits are used when the operations of the three sections of the system must be synchronized on a block-by-block basis. A macroslice is defined as an interlocked set of slices in the three FIFOs 730, 732, and 734.

A typical MLO macroslice would result in the synchronization of: (1) MLO-D operations to assemble and input one or more blocks of data from SMEM to the macropipeline; (2) MLO-Z operations to input a block a data from the macropipeline to the block processor; (3) MLO-C block processor operations to produce one result block; (4) MLO-Z operations to output a previous result block from the I/O side of the zone buffers from the block processor to the macropipeline; and (5) MLO-D operations to disassemble a result block in the macropipeline and intercalate and store its individual elements into a subarray in the SMEM. Thus, the end-of-slice and interlock bits control the swapping of the double-buffered local memories within the macropipeline and the swapping of the I/O and working side memories of the block processor, and ensure that the controls for subsequent data blocks in each section of the system are issued at such a time that all necessary preceding computations in every stage are finished.

Typical command identifiers and control parameters of this embodiment are described in Appendix A to the application with reference to FIGS. 8, 9, 10, and 11.

Block decomposition means 100 provides succeeding stages of control enrichment. A single primitive is broken into a sequence of single block operations by the block algorithm frame template. Each command block template contains a number of individual commands, each of which activates one of the command-forming modules such as blocking module 720, zone I/O module 722, or compute module 724. Each of the command-forming modules may result in the issuance of a plurality of individual MLO fields. The control and address generator which receives the MLO fields will now be described in detail.

Referring to FIG. 13, control and address signal generator 102 comprises SMEM control and address signal generator 311, pipeline control and address signal generator 312, and processor control and address signal generator 313. Data block definition MLO fields from the MLO-D FIFO are transmitted to SMEM controller 311 via MLO-D bus 353. Data block movement MLO fields from the MLO-Z FIFO are transmitted to the pipeline controller 312 via MLO-Z bus 351. Computational MLO fields from the MLO-C FIFO are transmitted to computational controller 313 via MLO-C bus 352.

SMEM controller 311 is coupled to SMEM, via lines 24, to the alignment means via line 72, and to the macropipeline via lines 73. SMEM controller 311 generates, in response to data block definition MLO fields, SMEM control and address signals to control the SMEM to perform burst transfers, to control the alignment means to select the desired data from the burst transferred data, and to control the macropipeline to transfer the selected data between the system bus and selected storage locations of the funnel buffers.

Pipeline controller 312 is coupled to the macropipeline via line 71 and to the block processor via lines 290. Pipeline controller 312 generates, in response to data block movement MLO fields, pipeline control and address signals to control the macropipeline and the block processor so as to transfer data between the funnel buffer and the block processor.

Processor controller 313 is coupled to the block processor via working side buffer control lines 287 and zone processing element control lines 286. Processor controller 313 generates, in response to computational MLO fields, control and address signals to configure and control the block processor to store blocks of data in selected storage locations and to perform a block operation.

Processor controller 313 is also coupled to the macropipeline via line 292 for controlling global data transfers to the block processor.

Synchronization information passes between the SMEM controller 311 and the pipeline controller 312 via enable DX signal line 885 and DX busy signal 880. Separate synchronization information passes between the pipeline controller 312 and the processor controller 313 via the synch-Z signal line 890 and the synch-C signal line 895.

As each controller receives MLO field signals, it builds up a complete control word for the part of the system that it controls. When it receives an end-of-slice signal the control word becomes active. As soon as the control word becomes active, the controller can begin to prefetch a subsequent control word.

Referring to FIG. 14, the structural elements which support MLO field prefetch and inter-controller slice synchronization are shown. Each of the controllers 311, 312, and 313 comprises: a sequencer, one or more address generators, an MSYNCH, one or more MLO decoders, and a plurality of staging register-working register pairs connected to each decoder.

The individual parts of the aforesaid classes, for each controller, are named and numbered in Table IV. Also shown in FIG. 14, and numbered in both the diagram and Table IV, are the parts of the individual MLO busses. Generically, each MLO bus includes: an instruction portion (/I), an end-of-slice bit (/e), an MLO-valid bit (/v), and an MLO diagnostics-valid bit (/d), which all come from the primitive decomposer 300 to the control generators 311, 312, or 313, and an MLO request bit (/r), which is a signal back from the controllers to the block decomposer.

Internal signals are also shown in FIG. 14 and Table IV. Generically, these include: a DONE signal from the sequencer to the MSYNCH, a start signal from the MSYNCH to the sequencer; load signals which cause the working registers to each load the contents of the staging register with which they are paired, the load signals being branches of the START signal; and MLO data signals from each working register to the sequencer or address generator which that MLO instruction controls.

Each of the controllers is connected to its own MLO bus. The processor controller 313 is connected to the MLO-C bus 352, the pipeline controller 312 is connected to MLO-Z bus 351, and the SMEM controller 311 is connected to the MLO DX bus 353.

TABLE IV

| Control Generator Parts | | | | | |
|---|---|---|---|---|---|
| DX Control Gen | 311 | ZIO Control Gen | 312 | CP Control Gen | 313 |
| SEQ DX | 811 | SEQ Z | 821 | SEQ_C | 831 |
| Packing AGEN | 812 | FZ AGEN | 822 | Working Side AGEN | 877 |
|  |  | ZIO AGEN | 823 |  |  |
| MSYNCH_DX | 813 | MSYNCH_Z | 824 | MSYNCH_C | 832 |
| DECODE_D | 814 | DECODE_F | 825 | DECODE_C | 833 |
| S.REG_D | 815 | S.REG_F | 871 | S.REG_C | 834 |
| W.REG_D | 816 | W.REG_F | 872 | W.REG_C | 835 |
|  |  | DECODE_M | 826 | DECODE_W | 836 |
|  |  | S.REG_M | 873 | S.REG_W | 437 |
|  |  | W.REG_M | 874 | W.REG_W | 438 |
|  |  | DECODE_Z | 827 |  |  |
|  |  | S.REG_Z | 875 |  |  |
|  |  | W.REG_Z | 876 |  |  |
| MLO BUSES | | | | | |
| MLO DX/I | 840I | MLO Z/I | 850I | MLO_CP/I | 860I |
| MLO DX/v | 840v | MLO Z/v | 850v | MLO_CP/v | 860v |
| MLO DX/e | 840e | MLO_Z/e | 850e | MLO_CP/e | 860e |
| MLO DX/R | 840R | MLO_Z/R | 850R | MLO_CP/R | 860R |
| Internal Signals | | | | | |
| DX_DONE | 841 | Z_DONE | 851 | CP_DONE | 861 |
| DX_START | 843 | Z_START | 852 | CP_START | 862 |
| DX_e | 843 | Z_e | 853 | CP_e | 863 |
| DX_Load | 844 | Z_Load | 854 | CP_Load | 864 |
| DX_MLO Data | 845 | Z_MLO Data | 855 | CP_MLO Data | 865 |

TABLE IV-continued
Control Generator Parts

DX_Terminator  866

Each of the controllers receives MLO instructions which are grouped into MLO slices that are terminated by an end-of-slice bit. Each MLO slice is acted upon in two phases: a prefetch base during which all the MLO instructions of the slice are transmitted to the controller, and a working phase during which the controller controls the system in accordance with the previously transmitted MLO slice. The two phases in the processor (CP) controller provide a specific example.

The CP prefetch phase begins when MSYNCH-C 832 sends an MLO-C/Request signal 860R to the MLO-C FIFO 734 of the block decomposer 100, and the prefetch phase continues for as long as the MLO-C/Request 860R is present. During the MLO-C prefetch phase, the MLO-C FIFO 734 will continue to send MLO instructions until it is empty.

Each MLO instruction contains an address field and a data field. MLO-C fields are bussed to both DECODE-C 833 and DECODE-W 836 and to all the MLO-C staging registers 834 and MLO W staging registers 837. The bit pattern in the address field will be decoded and a load control signal sent from either the DECODE-C 833 or DECODE-W 836, which will cause the loading of the MLO-C data field into one of the MLO-C staging registers 834 or one of the MLO-W staging registers 837. The bit pattern of the address field pertaining to any one register is unique, so that only one register, out of the entire selection of MLO-C and MLO-W staging registers, will be loaded.

When the end-of-slice bit MLO-C/e 860e is received by the MLO-C decoder 833, one MSYNCH end slice signal 863 is sent from the MLO-C decoder 833 to the MSYNCH-C 832, which immediately stops sending the MLO-C/request signal 860R. If the CP Done signal 861 from SEQ-C is also present at MSYNCH-C 832, MSYNCH-C 832 will transmit a load signal 864 simultaneously to all the working registers 835 of sequencer C 313 and to the working registers 838, of the working side address generator 877, and a start signal to SEQ C 831.

Upon receipt of the load signal 864, each working register of the combined plurality of W-REG-C 835 and W-REG-W 838 working registers immediately loads the value that is held in the staging register with which it is paired. All of the working registers 835, 838 are loaded simultaneously and they then form the control word for the next block operation of SEQ-C 831.

Advantageously, the contents of the staging registers are not destroyed by the load operation (unless they are deliberately cleared). Because the staging registers are separately addressable, the block decomposer may transmit only those MLO fields which it wants to change from their value in the previous MLO slice. This feature minimizes traffic on the MLO busses.

A block operation, once started, continues until finished, at which point SEQ-C 831 may put out the done signal 861 if either of the following conditions hold: Firstly, if the CPNOLOCK bit was set in the MLO control fields of the just-finished slice; or secondly, if the SYNCH-Z signal is valid.

SEQ-Z 821 and SEQ-DX 811 are similar in function in that they may execute slice after slice of MLO instructions if no interlock signal is present. This happens as follows:

The MLO-D field called TERM 846 is the interlock bit for SEQ-DX 811. If "term" is not present, MLO-D slice after MLO-D slice will be executed. On the other hand, if "term" is present, then SEQ-DX 811 will only execute until the end of the slice in which "term" occurs, and then will wait until a new EN-DX pulse arrives from SEQ-Z 821. Similarly, the MLO-Z field term called ZNOLOCK (−) is the interlock term for SEQ-Z 821. SEQ-Z 821 may be interlocked to SEQ-C 83 in that way that SEQ-C 831 is interlocked to SEQ-Z 821. With the four synchronization lines present among these three control generators, one may synchronize all three together, allow them to run asynchronously, or synchronize just a pair of them.

Each of the control generators is operative to construct sequences of addresses for two-dimensional address arrays. The block-level operations specified by the MLO fields are thereby translated into data element level operations.

The processor (CP) controller and the SMEM (DX) controller have specialized functions that the pipeline controller does not. The SMEM (DX) controller's specialized functions are as follows: First, it arbitrates with the memory controller so that requests for memory access from units other than the block processor are honored as well. Second, the DX controller automatically selects the optimal SMEM access mode, whether that be random or block access or partial write, on the basis of memory stride information provided in MLO fields from the block decomposer. Third, the DX controller must compute the position of each logical word within each wide word on the SBUS "on the fly" in order that these logical words may be extracted and packed by the alignment means.

The CP controller has three specialized functions: First, the doubly-looped, doubly-strided CP controller provides detailed point operation control to the block processor in response to simple block operation specifications via MLO fields from the block decomposer. Second, it can execute several block processor instructions per point operation. This means that data can be moved internally within the processing element among a number of latches, while several computations go on, thus allowing quadratic and look-up table computations and so on, before even a single point of data is stored. The sequence of block processor instructions for a given CP operation that happens between point operations is present in the computational controller in the form of microcode within its random access memory. Third, the CP controller provides pipeline synchronized signals for the processing element and working side zone buffer of the block processor.

The processor (CP) controller provides detailed control for every element of a multi-dimensional block of computed results. It functions as a box operation generator.

A box operation is a 1D, 2D, or 3D array of point operations, which create a 1D, 2D or 3D array of numerical results. A point operation is an operation which produces an element of the multi-dimensional block of numerical results from a box operation. Each element has a 1D, 2D, or 3D address to locate it within the array of numerical results. A point operation may require several mathematical steps to compute. The control setting for the block processor to accomplish any one of these mathematical steps is called a machine instruction (MINST).

The combination of CP controller 313 and block processor 18 of this embodiment uniquely supports box operations. One dimension of data presented to the outside world is the column numbering, i.e., numbering of the individual zone buffers, and the other one or two dimensions are provided explicitly by addresses generated by the CP controller 313.

Referring to FIG. 15, the CP controller of this embodiment comprises: MLO-CP decode 910; a doubly-looped counter control 902; a doubly-strided address generator 967; a single clock next instruction addressing unit 906; CP sequencer RAM 914; and synchronous delay registers 908. Also shown in the figure are: outside signal sources 912; MLO CP FIFO 734; zone processing elements 44; zone buffer memories 40; and MLO CP bus 352.

Doubly-looped counter 902 and doubly-strided address generator 967 work together to transform either singly- or doubly-indexed array addresses to simple linear addresses within the zone buffer memories. The doubly-looped counter 902 permits a sequence of vectors of addresses to be computed without loading additional information or new vector starting addresses with each new vector.

Counter 902 is initialized by loading two "strides" or address advance parameters and a starting address on line 920 from decoded MLOs which then serve to address both rows and columns of referenced data sets stored in the block processor.

Counter 902 provides incrementation of the row and column indices and signals the doubly-strided address generator 967 to recompute the linear address with each incrementation. For each point operation, counter 902 causes the generation of operationally synchronized control signals and address generator 967 generates operationally synchronized addresses. The execution of an entire set of operationally-synchronized controls, in sequence, results in one row of results.

In operation, the counter 902 receives decrements on line 918 from the issued RAM instruction 916, and control from addressing unit 906. The counter returns zero flags on lines 922 at the ends of columns and rows, to the next instruction addressing unit which uses the zero flags 922 in conjunction with jump select fields on line 924 in the current microcode word on line 926, instruction logic MLOs on line 916, and external signals 924, to generate the RAM address of the next issued instruction on line 926.

The next instruction addressing unit performs an 8-way conditional branch within each clock cycle so that branches appropriate to the next column of a data array may be taken just as quickly as a "next row" branch.

The CP sequencer RAM 914 responds to the issued address on line 926 by issuing a new instruction word on line 916, except in the case when new microcode is being loaded, in which case an instruction word is stored.

The instruction addressing unit 906, under control of MLO fields and microcode instruction, can operate in the following modes, as detailed in Table V:

(a) Install microcode at a specified address
(b) Read microcode located at a specified address
(c) Execute microcode starting at a specified address
(d) Read the current address
(e) Reset address to zero
(f) Execute subroutine jump and return in microcode Controls for the block processor initiate at 3 points within the CP controller:

1. Static controls (valid for every point of a block operation) initiate in the MLO fields on line 928
2. Working side addresses on line 930 (one for each point of each array used in a box operation) originate in the box operation generator
3. Machine Instructions (MINST) for each clock cycle of computation within the block processor originate in the CP microcode on line 932 for the process being performed.

TABLE V

Basic CP SEQ Operational Modes

TO INSTALL N WORDS OF μCODE
via PROM . . . Burn CPSEL PROM to ref starting address
via CP MLOs . . . N sets for N μcode words

- LDUADR (0:9)    Address of word
- LDUW0 (0:11)
- .    Contents of word to load    N Times
- .
- .
- LDUWG (0:11)

TO READ N WORDS OF μCODE FROM RAM
vis CP MLOs . . . N sets for N words

- LDUADR (0:9)    Address of word
- RDUW0 (0:11)
- .    Contents of word to read    N times
- .
- .
- RDUWG (0:11)

TO READ THE CURRENT ADDRESS
via CP MLO
                               RDUADR Read current address
JUMP TO ADDRESS ZERO. NO RETURN
via HW:      RESET command
via μc:      .10 instruction in μcode
START AT A PREVIOUSLY μCODED PROGRAM
via MLO:      CPSEL (0:7)    7-Bit location in CPSEL prom of starting address of μcode program
via μc:      JC    μCode instruction to jump to address indicated

TABLE V-continued

Basic CP SEQ Operational Modes by CPSEL command

JUMP AND RETURN
via μcode

| | LOADAUX | Store current address |
|---|---|---|
| | JI<0:9> | Jump immediately to code at address μcode <0:9> |
| | . | } |
| | . | |
| | JA | Jump back to stored address  Subroutine |

Upon origination, the aforementioned controls are synchronized by computational point, rather than time, as if the processor 44 were one stage deep. The synchronous delay lines 908 provide an appropriate delay for each of the control signals 928, 930, and 932, so that the control for each element to be computed reaches any given stage of the zone processor 44 simultaneously with the arrival of the data which is to enter into the computation.

Details of an embodiment of the CP sequencer are given in FIG. 16. The next instruction addressing unit 906 comprises three layers of highly parallel logic. Those layers are:

Layer 1: Parallel Jump Enable Logic 3306
Layer 2: Priority Jump Selector 3304
Layer 3: Address Issue Unit 3302

The counter logic 902 of the embodiment shown in FIG. 16 comprises a plurality of counters 3145W, 3146W, 3147W, and 3148W, a counter control unit 3402, and a plurality of working address generators 967. The MLO decode logic comprises an MLO-C Decoder 833, MLO-W decoder 836, a CP SEQ Synchronization Means (MSYNCH) 832, a diagnostic box 3103, a plurality of staging registers 3105 which are individually named and numbered 3141S-3161S, and a corresponding plurality of working registers 3106 which are individually numbered 3141W-3163W, and given individual neams to correspond to the names of the individual staging registers 3105 with which they are paired.

As explained above, the MLO decode logic performs the functions of MLO instruction prefetch and participates with the SEQ-Z in inter-sequencer slice synchronization. MLO-C decoder 833 and MLO-W decoder 836 decode the address field of each incoming MLO instruction and supplies a load control signal 3105 to just one of the MLO-C staging registers 3141S-3161S, causing it to load the CP MLO data field into itself. Then at the appropriate time the CP MSYNCH 832 transmits a start signal 862 to all the logic units 3302, 3304, and 3306, and to all the working registers 3141W-3163W, causing them all to load simultaneously from their corresponding staging registers 3141S-3163S at the same time that the various logic units are started in operation for the execution of a new slice.

The MLO decode logic for CP controller 313 has two idiosyncrasies which distinguish it from the decode logic of the DX controller 311 and the ZIO controller 312: Firstly, the autoclear working register 3142W sends back a signal 3141d to the CPSEL staging register 3141S which causes it to clear immediately after its contents are loaded into the CPSEL working register 3141W. Thus the next CPSEL field will specify a NOOP unless the CPSEL staging register 3141S is explicitly loaded with a new non-NOOP CPSEL MLO field. Secondly, the counter working registers 3145W, 3146W, 3147W, and 3148W are, in fact, counters rather than simple registers.

Each one of the counters 3145W-3148W has a load function which is activated by the common load signal 3104 from MSYNCH-C in synchronism with the load function of all the working registers 3141W-3163W of the CP MLO decode logic. Two of the counters, C2 3146W and D1 3147W, take their loaded values directly from the corresponding staging registers 3146S and 3147S, while the C1 counter 3145W takes its loaded value from an intermediate holding register 3145H, which was previously loaded by the C1 staging register 3145S: and the D2 counter 3148W, acting like C1 3145W, takes its loaded value from an intermediate holding register 3148H, which was previously loaded by the D2 staging register 3148.

Unlike the other working registers, however, the counters 3145W-3148W each have a secondary load function, activated by a secondary load signal 3145sl-3148sl from the counter control 3402, and a decrement function which reduces the registered value by one, which is activated by a decrement signal 3145d-3148d which is also from the counter control 3402.

The counter control logic 3402 acts to control the secondary loading and decrementation of the four counters, according to the logic equations given in Table VI. It also passes on the negation "ZERO X L" of the zero flags "ZX," which it receives from the individual counters 3145W-3148W, to the parallel jump enable logic 3306. It passes on the "UPDATE" signal to the address generators 3404.

The next instruction addressing unit 906 uses parallel logic circuitry concentrated within three layers 3306, 3304, and 3302 to accomplish an 8-way conditional branch within each clock cycle. In operation, the parallel jump enable logic 3306 receives internal signals from the microcode 916, the counter control 3402, the MLO working registers 3143, 3144, and the MSYNCH 832, as well as external signals from the ZIO sequencer, as shown in detail in Table VII(a). The jump enable logic 3306 determines a plurality of jump enable signals 3310 3314 from the input signals of Table VII(a) on the basis of the logic equations given in Table VII(b).

As shown in Table VII(b), none of the logic equations requires a logic array more than two gates deep, so a conservative estimate for the input signal to output signal delay is 6.0 ns for an implementation with commercially available 10K HECL PALs (Programmed Array Logic).

The jump enables signals 3310-3314, output from the parallel jump enable logic 3306, are fed into the priority jump selector 3304, along with the signals CP ENB 3115. LD UADR 3116 and RESET 3117 from the CP SEQ DBOX 3103. More than one jump enable signal 3310-3314 and one or more of RESET 3117 and LD UADR 3116 from the CP SEQ DBOX may be simultaneously active.

The priority jump selector 3304 chooses just one jump from among the enabled jumps 3310-3314, 3316, 3317 from the jump enable logic 3306 and the DBOX 3103 according to the priorities listed in Table VII(c), and outputs the appropriate control signal pattern as shown in the table for that jump to the address issue unit 3302. Those signals, S1 3331, S2 3332, SA 3333, SB 3334 and CLR MUX 3335 are used to determine which address, of those listed in Table VII(c), is to be output by the address issue unit 3302.

The plurality of address control signals listed in Table VII(c) is computed in parallel by the priority jump selector 3304 according to the logic equations of Table VII(d). None of the logic equations is more than two gates deep, as implemented in commercially available 10K HEKL PAL circuitry, and can produce a computed output within 6.0 ns of arrival of the input signals.

An illustrative embodiment of the address issue unit 3302 is shown in FIG. 17. The address issue unit comprises a 4-choice MUX with a clear 3302M; a counter with load, hold, increment, and decrement functions 3302C; a register means 3302A for auxiliary addreses; a register means 3302R for MLO-provided addresses; and a PROM 3302C for the CPSEL address, which is the starting address of an MLO-selected microcode routine. A detailed explanation of the operation of address issue unit 3302 is given in Appendix B to this application.

In summary, it may be seen that the present invention provides a computer architecture for performing complex mathematical operations on large arrays of data at high speeds. The data block path supports the selective transfer of computational blocks of data words from a system memory to a parallel, pipelined block processor. The decomposition and control structure operates via a command heirarchy which it provides between the general-purpose comptuer and the block processor and data path. It provides the means whereby a few easily understood commands from an ordinary speed general purpose computer can control every detail of the much faster block processor and its supply of data blocks. Programming is simplified, and control bandwidth is reduced.

TABLE VI
CP Counter Control Logic 3402

Outputs

Wag Signal:
UPDATE = JC & !START

Loads:
L0 = START #(!CLK & CP EN & I0)
L1 = START
L2 = START
L3 = START #(!CLK & CP EN & I3)

Decrements:
D0 = CLK #(!CLK & CP EN & z0 & d0)
D1 = CLK #(!CLK & CP EN & z1 & d1)
D2 = CLK #(!CLK & CP EN & z2 & d2)
D3 = CLK #(!CLK & CP EN & z3 & d3)

Intermediates
I0 = z0 & JC
I3 = z3 & JC
d1 = (CTYPE & d0) #(!CTYPE & d0 & z0)

Inputs

| (Signals) | (Source) | (Meaning) |
|---|---|---|
| z0,z1,z2,z3 | Counters | zero flags |
| d0,d1,d2,d3 | μcode | decrement enables |
| JC | Next instruction logic | next addr from CPSEL |
| CTYPE | MLO field | counter type (1D/2D) |

TABLE VII(a)
Next Instruction Logic

Layer 1. Input Signal Sources to Jump Enable Logic

| Source | Signal(s) | Numbers |
|---|---|---|
| μcode | SEL JO 0. SEL JO 1 | 3320 JO |
|  | SEL JA | 3320 JA |
|  | SEL INC | 3320 INC |
|  | SEL JC 0.SEL JC 1 | 3320 JC |
|  | SEL JI 0. SEL JI 1. SEL JI 2 | 3320 JI |
| Counters | ZERO 0 L. ZERO 1 L | 342 |
|  | ZERO 2 L. ZERO 3 L |  |
| SEQ Z | SYNCH Z |  |
|  | NZERO |  |
| MLO | NOLOCK | 3143 |
|  | CTYPE | 3144 |
| MSYNCH | START | 3104 |

TABLE VII(b)
Next Instruction Logic

Layer 1. Jump Enable Logic Equations

EN JO = (SEL JO & SEL JO 1 & SYNCH
 # NOLOCK & SEL JO 0 & !SEL JO 1 & !ZERO 2 L
 # CTYPE & NOLOCK & !SEL JO 0 & SEL JO 1 & !ZERO 1 L & !ZERO 2 L
 # !CTYPE & NOLOCK & !SEL JO 0 & SEL JO 1 & !ZERO 0 L & !ZERO 1 L & !ZERO 2 L):
EN JA = (SEL JA):
EN INC = (SEL INC):
EN JC = (!SEL JI 0 & SEL JC 1 & !ZERO 3 L)
 # SEL JC 0 & !SEL JC 1 & ZERO 0 L
 # SEL JC 0 & !SEL JC 1 & !ZERO 3 L
 # SEL JC 0 & SEL JC 1 & START):
EN JI 1 = (SEL JI 0 & SEL JI 1 & !SEL JI 2
 # !CTYPE & SEL JI 0 & !SEL JI 1 & !SEL JI 2 & ZERO 0 L
 # CYTPE & !SEL JI 0 & SEL JI 1 & !SEL JI 2 & !ZERO 1 L
 # SEL JI 0 & !SEL JI 1 & !SEL JI 2 & ZERO 0 L & ZERO 1 L
 # !CTYPE & !SEL JI 0 & SEL JI 1 & !SEL JI 2 & !ZERO 0 L
 # & !ZERO 1 L):
 # (NZERO & SEL JI 0 & SEL JI 1 & SEL JI 2
 # !SEL JI 0 & !SEL JI 1 & SEL JI 2 & !ZERO 0 L
 # !SEL JI 0 & SEL JI 1 & SEL JI 2 & !ZERO 0 L
 # SEL JI 0 & !SEL JI 1 & SEL JI 2 & !ZERO 0 L
 # CTYPE & !SEL JI 0 & !SEL JI 1 & SEL JI 2 & !ZERO 1 L

TABLE VII(c)

Next Instruction Logic

Layer 2. Address Selection Priority and Control

| Priority | Jump | Address |
|---|---|---|
| 1 | RESET | Zero |
| 2 | LD UADR | MLO <0:9> |
| 3 | JUMPO | Zero |
| 4 | JUMPI | Immediate (μcode <0:9>) |
| 5 | JUMPC | A(CPSEL Prom) |
| 6 | JUMPA | Aux Register |
| 7 | INC | Current Address +1 |
| 8 | None | Current Address |

Layer 2. Address Control Signal Patterns

| Address | Signals | | | | |
|---|---|---|---|---|---|
| | S1 | S2 | SA | SB | CLR MUX |
| Zero | 0 | 0 | | | 1 |
| MLO <0:9> | 0 | 0 | 1 | 1 | 0 |
| Immediate | 0 | 0 | 1 | 0 | 0 |
| CPSEL | 0 | 0 | 0 | 1 | 0 |
| Aux Register | 0 | 0 | 0 | 0 | 0 |
| Current +1 | 0 | 1 | | | |
| Current | 1 | 1 | | | |
| Current −1 | 1 | 0 | | | |

TABLE VII(d)

Next Instruction Logic

Layer 2. Control Signal Computation

```
SELB = (LD UADR # CP ENB & !EN JO & EN JC & !EN JI & !LD UADR);
SELA = (LD UADR # CP ENB & !EN JO & EN JI & !LD UADR);
  S2 = !(CLK
       # !CLK & LD UADR
       # !CLK & RESET
       # !CLK & CP ENB & EN JO
       # !CLK & CP ENB & EN JA
       # !CLK & CP ENB & EN JC
       # !CLK & CP ENB & EN JI);
  S1 = # (!CLK & LD UADR
       # !CLK & RESET
       # !CLK & CP ENB & EN JO
       # CLK & CP ENB & EN JA
       # !CLK & CP ENB & EN JC
       # !CLK & CP ENB & EN JI
       # !CLK & CP ENB & EN INC & !EN JO & !EN JA & !EN JC & !EN JI);
CLR UADR = (RESET # CP ENB & EN JO & !LD UADR);
JUMPC CPY = (CP ENB & !EN JO & EN JC & !EN JI & !LD UADR & !RESET);
```

The principal stages in the hierarchical enrichment of commands from the general purpose computer are:
1. Primitive Command Packet
2. Algorithm Framework
3. Linear Command Blocks
4. MLO fields issued from the MLO FIFOs
5. Synchronized Slice Execution An example of the control hierarchy for the operation "matrix multiply and add" with references to FIGS. 18-20 is provided as appendix C to this application.

The invention thus supports the use of block decomposition algorithms by supplying and removing computational blocks of data to and from the block processor at a rate which allows the processor to operate virtually continuously.

The aforegoing description of the preferred embodiment is not intended to limit the scope of the invention; the invention is defined by the appended claims.

APPENDIX A

Examples of Command Identifiers and Control Parameters Used In Block Decomposer

Typical command identifiers and control parameters used in the linear command blocks are listed in Table VIII. A typical command might appear as follows in a linear command block:

CBLK C.PAR4

"CBLK" is the command identifier which calls for activation of the CBLK module, which is one of the blocking modules 650. "C.PAR4" identifies the fourth parameter area of the CDX register as the working area for this command.

The actions of the individual modules of the blocking 720, ZIO 722, and CP 724 classes will now be explained in greater detail, beginning with the blocking modules 720. Each blocking module 720 interacts with a designated parameter in the CDX register. The compound CDX registers contain a description of up to six parameters for each primitive. Each parameter is divided into a specified number of blocks by the build CDX modules, and the compound CDX register contains both a description of the entire parameter and a single block which is called the "current block."

Referring to FIG. 9, the memory adresses of a parameter 741 and its blocks are represented by position on the two-dimensional figure. The current block 790 is shown cross-hatched.

Blocking module BLCK reads out the description of the current block 790, including starting address, row stride, and column stride, and transmits that information to the MLO-D FIFO. The MLO fields which are loaded into the MLO-D FIFO by a blocking module are listed in Table IX(a). Alternatively, the blocking module may modify the description so that it refers to another block, and place that description back in the current block description of the same parameter in the CDX registers.

TABLE VIII

Command Identifiers

| DX | ZIO | CP General | CP Algorithmic |
|---|---|---|---|
| CBLK | ZINIT.A | CP.RSTAT | MMA.INIT |
| RBLK | ZINIT.B | CP.CSTAT | CP.MMA |
| BLCK | ZINIT.C | CP.NOLOCK | CP.SCALE |
| IBLK | ZINIT.D | CP.ZIO | M INIT |
| NEWCOL | | CP.NOP | MMA INIT |
| NEWROW | ZI.B | SET ZONES | CV INIT |
| NXTCOL | ZI.C | NEW.CP MASK | CP CVX |
| NXTROW | ZI.D | Z BUMP | |
| FILL | | | |
| SCLR | ZI.BE | SET ZONES | |
| BUMP.ROW | ZI.CE | SET CP ZONES | |

TABLE VIII-continued

| Command Identifiers | |
|---|---|
| BUMP.COL | ZI.DE |
| VBLK | ZI.INIT |
| CVBLK | ZI.LOCK |
| SWAP | ZI.NOP |
| | R SP |
| | SWP L |
| | SWP R |
| | SWP B |

| DX | Z | CP | Control Parameters and Signals | |
|---|---|---|---|---|
| 776A | 777A | 778A | Command Identifier | |
| 776B | 777B | 778B | P0 | CDX pointer |
| 776C | 777C | 778C | P1 | Funnel Buffer Identification |
| 776D | 777D | 778D | TERM | BLOCK Terminator |
| 776E | 777E | 778E | P3 | T BUFFER COUNT |
| 776F | 777F | 778F | LOCK | Interlock Parameter |

TABLE IX(a)

| DX MLO Field Definition | | |
|---|---|---|
| DX SET-UP FIELDS | | |
| <XXX1000>FID | (00:01) | : funnel ID<br>: 00 A funnel<br>: 01 B funnel<br>: 10 C funnel<br>: 11 D funnel |
| <XXX1000>DIR | (02) | : access direction<br>: 0 SMEM to funnel buffer<br>: 1 funnel buffer to SMEM |
| <XXX1000>TERM | (03) | : terminal DX indicator<br>: 0 not terminal; do another DX<br>: 1 terminal; no more DXs after this |
| <XXX0000>SA1 | (00:15) | : lower 16 bits of word start address |
| <XXX0001>SA2 | (00:15) | : upper 16 bits of word start address |
| <XXX0010>BWC1 | (00:15) | : lower block word count<br>: = (number of rows) * IBR |
| <XXX0011>BWC2 | (00:10) | : upper block word count<br>: = (number of rows) * IBR |
| <XXX0100>NC | (00:10) | : number of columns (# of words in a row) |
| <XXX0101>IBR | (00:15) | : increment between rows |
| <XXX0110>IBC1 | (00:15) | : lower 16 bits of increment<br>: between columns |
| <XXX0111>IBC2 | (00:15) | : upper 16 bits of increment<br>: between columns |

The actions of several typical block modification modules are illustrated in FIG. 9. Thus, BUMP.ROW 791 increments the current block to the next block of the same block row; BUMP.COL 792 increments the current block description by one block now, within the same block column; NXT.ROW 793 increments the block row by +1 and sets the current block descriptor to the first block of that block row; NEWROW 794 returns the current block description to the beginning of the current block row; NEWCOL 795 returns the current block description to the first block of the current block column; and NXT.COL 796 modifies the current block description to the beginning of the block column after the current one. Some of the blocking modules have a double action whereby the current block position description is read and forwarded to the DX FIFO, as well as modified and replaced into the CDX register. This is shown in Table IX(b).

The module SCLR 797 may be considered to be a degenerate blocking module. It extracts the address of a scalar from the CDX registers and sends that address and several other MLO fields to the DX FIFO. The execution of those fields will result in the transfer of a scalar value from SMEM into the macropipeline.

There are two kinds of zone I/O modules: Those that are generalized; and those that are specialized to a problem or a class of problems. Examples of generalized modules are ZI.NOP and ZI.NOLOCK. The ZI.NOP module causes that part of the system concerned with moving blocks of information from the macropipeline to the block processor to suspend operation. The ZI.NOP command is often used, in conjunction with the block terminator parameter to allow other parts of the system to "catch up" and be synchronized with the zone I/O section.

TABLE IX(b)

| Double-Action Blocking Modules | |
|---|---|
| BLOCKING MODULE | 2 EQUIVALENT MODULES TO ACCOMPLISH SAME |
| CBLK | BLCK<br>BUMP.COL |
| RBLK | BLCK<br>BUMP.ROW |
| IBLK | BUMP.COL |
| BLCK | Just extracts current block description and forwards it to the DX FIFO. |

The ZI.NOLOCK module sets the zone I/O wait bit to zero so that zone buffer swaps and other zone I/O processes may proceed in spite of any ongoing CP process. The specialized modules ZIO X, ZINIT.X, and ZI.INIT, where X is the identifier of a funnel buffer in the macropipeline, are all used in matrix multiply and add (MMA), as well as the related matrix add (MA) and matrix multiply (MM). They each control separate parts of the data block path. Other modules control the same three parts of the data path, but with alternative settings, for use with other mathematical primitive command packets.

ZINIT.X (where X=A, B, C, D)

These four modules control zone side funnel buffer setup, as shown in FIG. 10. ZINIT.A will specify addressing and access type parameters 643 and 644, which ultimately control the zone I/O side of funnel A 334. Similarly, ZINIT.B supplies control parameters 643-644 for funnel buffer B 630. ZINIT.C supplies control parameters 643 and 644 for funnel buffer C 630, and ZINIT.D supplies control parameters 643 and 644 for funnel buffer D 630. As shown in Table IX(c), the MLO fields contain addressing, block size, and access type information for each funnel buffer. Also listed in Table IX(c) are controls fo rthe A–C and B–D paths which are used for data rearrangement. The table also shows the parameter values specifically sent by the ZINIT.X modules in the column on the left, and illustrates how these represent but one of several possible configurations of a particular part of the system.

ZI.INIT

This module sets the control parameters for the addressing and access of the I/O side of the zone memories in the block processor and for the data paths between the block processor and the macropipeline, as shown in FIG. 11. The MLO fields which are set to provide this control are listed in Table IX(d).

shown in FIG. 11. The MLO fields which are set to provide this control are listed in Table IX(d).

ZI.X (where X-A.B.C.D. . . . )

These four modules load the enable signals shown in Table IX(e) into the MLO-Z FIFO 732. Each module may be activated by either a ZI.X or a ZI.XE command, with the only difference being that ZI.XE causes an end-of-slice bit to be included in the MLO data fields loaded by the ZI.X module. The "X" designation implies that ZI.X loads information destined to control funnel buffer X. Turning now to FIG. 12, we see that each of the ZI.X modules puts out signals to enable immediate transmission of data between funnel X and TABLE IX(c)

MLO Fields for ZINIT.X Modules

ZIO SET-UP FIELDS IN MIF

| | | | | | | |
|---|---|---|---|---|---|---|
| | | | <XX10000> | not used | | |
| ZINIT.A | 31 | | <XX10010> | NRA | (00:01) | : number of rows in A |
| | 31 | | <XX10010> | NCA | (00:10) | : number of columns in A |
| | | | <XX10011> | ACNTL | (00:03) | : A funnel control field |
| | | | | | | : described by the following subfields |
| | | | | AT | (00) | : transpose access for A |
| | | | | | | : 0 linear |
| | | | | | | : 1 transposed |
| | | | | AV | (01) | : vector access for A |
| | | | | | | : 0 matrix |
| | | | | | | : 1 vector |
| | | | | AR | (02) | : reversed vector access for A |
| | | | | | | : 0 forward access |
| | | | | | | : 1 reverse access |
| | | | | F2FCA | (03) | : C funnel/A funnel data path select |
| | | | | | | : 0 MDP connection |
| | | | | | | : 1 C funnel to A funnel connection |
| | | 0 | <XXX10100> | ASA | (00:10) | : starting address for vector in A |
| ZINIT.B | 31 | | <XX10101> | NRB | (00:10) | : number of rows in B |
| | 31 | | <XX10110> | NCB | (00:10) | : number of columns in B |
| | | | <XX10111> | BCNTL | (00:02) | : B funnel control field |
| | | | | | | : described by the following fields |
| | | | | BT | (00) | : transpose access for B |
| | | | | | | : 0 linear |
| | | | | | | : 1 transposed |
| | | | | BV | (00) | : vector access for B |
| | | | | | | : 0 matrix |
| | | | | | | : 1 vector |
| | | | | BR | (02) | : reversed vector access for B |
| | | | | | | : 0 forward access |
| | | | | | | : 1 reverse access |
| ZINIT.C | 31 | | <XX11000> | NRC | (00:10) | : number of rows in C |
| | 31 | | >XX11001> | NCC | (00:10) | : number of columns in C |
| | | | <XX11010> | CCNTL | (00:02) | : C funnel control field |
| | | | | | | : described by the following subfields |
| | | | | CT | (00) | : transpose access for C |
| | | | | | | : 0 linear |
| | | | | | | : 1 transposed |
| | | | | CV | (01) | : vector access for C |
| | | | | | | : 0 matrix |
| | | | | | | : 1 vector |
| | | | | CR | (02) | : reversed vector access for C |
| | | | | | | : 0 forward access |
| | | | | | | : 1 reverse access |
| ZINIT.D | 31 | | <XX11011> | NRD | (00:10) | : number of rows in D |
| | 31 | | <XX11100> | NCD | (00:10) | : number of columns in D |
| | | | <XX11101> | DCNTL | (00:03) | : D funnel control field |
| | | | | | | : described by the following fields |
| | | | | DT | (00) | : transpose access for D |
| | | | | | | : 0 linear |
| | | | | | | : 1 transposed |
| | | | | DV | (01) | : vector access for D |
| | | | | | | : 0 matrix |
| | | | | | | : 1 vector |
| | | | | DR | (02) | : reversed vector access for D |
| | | | | | | : 0 forward access |
| | | | | | | : 1 reverse access |
| | | | | F2FBD | (03) | : B funnel/D funnel data path select |
| | | | | | | : 0 MDP connection |
| | | | | | | : 1 B funnel to D funnel connection |
| | | | <XX11110> | not used | | |
| | | 0 | <XX11111> | DSA | (00:11) | : starting address for vector in D | the zone to funnel interconnect 660. These are the ENZIO and ENFZX fields indicated in Table IX(e).

Swap signals are also transmitted: ZI.B transmits a signal which ultimately causes the right leaf XXX of each zone buffer 220 to swap: ZI.C transmits a signal which causes the left leaf XXX of each zone buffer 220 to swap: and ZI.D transmits signals resulting in a swap of the D funnel buffer 630D.

Each of the ZI.X modules transmits ZNOLOCK=0 which means that a subsequent ZIO slice must wait for the ongoing CP slice to complete. The ZI.X modules transmit zeroes in the B2D and C2A fields [see Table IX(e)] which means that neither the A funnel to C path XXX nor the B funnel to D funnel path XXX in the zone buffer to funnel interconnect 640 will be activated as a result of the actions of the ZI.X modules.

TABLE IX(d)

MLO Fields for ZI.INIT Module

ZIO SET-UP FIELDS IN MCO

|  |  |  |  |  |  |
|---|---|---|---|---|---|
|  |  | <XX00001> | ACNTL | (00:10) | : ZIO control set-up field |
|  |  |  |  |  | : described by the following subfields |
| MCO | 1 |  | AMSTR | (00) | : A funnel master select |
|  |  |  |  |  | : 0 ZIO SEQ is controller |
|  |  |  |  |  | :   and Y path is A source |
|  |  |  |  |  | : 1 CP SEQ is controller |
|  |  |  |  |  | :   and A path sources AGLDAT |
|  |  |  |  |  | :   or zone 31 sources A path |
|  | 1 |  | EWED | (01) | : D funnel buffer write enable |
|  |  |  |  |  | : 0 D funnel → MDP |
|  |  |  |  |  | : 1 D funnel ← MDP |
|  |  |  | EWEA | (02) | : A funnel buffer write enable |
|  |  |  |  |  | : 0 A funnel → MDP |
|  |  |  |  |  | : 1 A funnel ← MDP |
|  |  |  | EWEB | (03) | : B funnel buffer write enable |
|  |  |  |  |  | : 0 B funnel → MDP |
|  |  |  |  |  | : 1 B funnel ← MDP |
|  |  |  | EWEC | (04) | : C funnel buffer write enable |
|  |  |  |  |  | : 0 C funnel → MDP |
|  |  |  |  |  | : 1 C funnel ← MDP |
|  |  |  | BCAST | (05) | : broadcast ZIO transfer |
|  |  |  |  |  | : 0 regular access |
|  |  |  |  |  | : 1 broadcast access |
|  |  |  | WSRC | (06) | : W path source select |
|  |  |  |  |  | : 0 B funnel path |
|  |  |  |  |  | : 1 A funnel path |
|  | 1 |  | CSW | (07) | : C switch select |
|  |  |  |  |  | : 0 broadcast from w to both C0, C1 |
|  |  |  |  |  | : 1 direct (w to C0,x to C1) |
|  |  |  | DSW | (08) | : D switch select |
|  |  |  |  |  | : 0 drive D0 & D1 to both a,d |
|  |  |  |  |  | : 1 direct (D0 to d, D1 to a) |
|  | 2 |  | NWORD | (09) | : number of words per access direction |
|  |  |  |  |  | : 0 1 words per access direction |
|  |  |  |  |  | : 1 2 words per access direction |
|  | 1 |  | BTYPE | (10) | : buffer configuration |
|  |  |  |  |  | : 0 single buffer |
|  |  |  |  |  | : 1 double buffer |
| ZAG | 1 | <XX00010> | LSTRD | (00:11) | : line address stride |
| ZAG |  | <XX00011> | LSADR | (00:11) | : first buffer line address |
| ZAG | 31 | <XX00100> | LCNTR | (00:11) | : line access count |
| ZAG | All | <XX00101> | ZMSK1 | (00:15) | : lower ZIO enable mask |
| ZAG | All | <XX00110> | ZMSK2 | (00:15) | : upper ZIO enable mask |
| ZAG | 0 | <XX00111> | ZADR | (00:04) | : first zone to be accessed |
| ZAG | 31 | <XX01000> | ZCNTR | (00:04) | : zone access count |
|  |  | <XX01001> to <XX01110> not used |  |  |  |
|  |  | <XX01111> | EMSK | (00:11) | : error enable mask |
|  |  |  |  |  | : described by the following subfields |
|  |  |  | EFATAL | (00) | : fatal error action |
|  |  |  |  |  | : 0 continue on fatal error |
|  |  |  |  |  | : 1 freeze on fatal error |
|  |  |  | (value 0 implies not a fatal error for the following) |  |  |
|  | 1 |  | EDPARE | (01) | : data parity error to be fatal |
|  | 1 |  | EMPARE | (02) | : MLO bus parity error to be fatal |
|  | 1 |  | EMMIFE | (03) | : MIF bus or MIF error to be fatal |
|  | 1 |  | EZIOE | (04) | : ZIO error to be fatal |
|  | 1 |  | ECPE | (05) | : CP error to be fatal |
|  | 1 |  | EADRE | (06) | : address collision to be fatal |
|  | 0 |  | EOVFE | (07) | : data overflow to be fatal |
|  | 0 |  | EUNFE | (08) | : data underflow to be fatal |
|  | 1 |  | EINVE | (09) | : invalid input to be fatal |
|  | 1 |  | EBUSY | (10) | : nonzero output to be fatal |

TABLE IX(e)

MLO Fields for ZI.X. Modules

| | | | | Field | Bit | Description |
|---|---|---|---|---|---|---|
| | <1> | <XX00000> | | ZCMND | (00:14) | : ZIO command field |
| | | | | | | : described by the following subfields |
| ZI.BE | | | | | | |
| ZI.CE | 1 | 1 | 1 | ENZIO | (00) | : funnel zone data xfer enable |
| ZI.DE | | | | | | |
| Set cos | 1 | | | ENSZR | (01) | : zone buffer swap enable right leaf |
| (bit 24) | | 1 | | ENSZL | (02) | : zone buffer swap enable left leaf |
| | | | | ZNOLOCK | (03) | : free Run. no interlock bit |
| | | | | | | : 0 wait for CP via an interlock |
| | | | | | | : 1 no interlock. do next slice |
| | | | | B2D | (04) | : enable funnel B to funnel D transfer |
| | | | | | | : 0 D is sourced from the MDP |
| | | | | | | : 1 D is sourced from the B funnel |
| | | | | C2A | (05) | : enable funnel C to funnel A transfer |
| | | | | | | : 0 C is sourced from the MDP |
| | | | | | | : 1 C is sourced from the A funnel |
| | | | 1 | SWAPD | (06) | : funnel D swap enable |
| | | | | SWAPA | (07) | : funnel A swap enable |
| | | | | SWAPB | (08) | : funnel B swap enable |
| | | | | SWAPC | (09) | : funnel C swap enable |
| | | | 1 | ENFZD | (10) | : funnel D zone I/O enable |
| | | | | ENFZA | (11) | : funnel A zone I/O enable |
| | 1 | | | ENFZB | (12) | : funnel B zone I/O enable |
| | | 1 | | ENFZC | (13) | : funnel C zone I/O enable |
| | | | | ENDX | (14) | : DX enable |

ZI.B, ZI.C, ZI.D ──── bit #

APPENDIX B

Operation of Address Issue Unit

Referring to FIG. 17, the MUX 3302M receives control signals 3302SA, 3302SB, and 3302CLR, the computations of which are given in Table VII(d). The counter receives two control signals 3302S1 and 3302S2, which are also computed as shown in Table VII(d). The data output part 3302MO of the MUX 3302M feeds the data load port 3302CI of the counter 3302C, while the data output 3302CO of the counter 3302C is, in fact, the address which must be supplied to the RAM 3200.

The address issue unit 3302 acts to provide each of the addresses indicated in Table VII(c) as follows:

| | |
|---|---|
| Zero | When S1 3302S1 and S2 3302S2 are zero, the load function of the counter is executed. If CLR MUX is also active, the MUX 3302M outputs a zero, which is the value loaded into the counter 3302C and transmitted as the address 3310 to the RAM 3200. |
| LD UADR | If 3302S1 and 3302S2 are zero while 3302SA and 3302SB are 1 (one), then the MUX will select bits 0:9 from the MLO and output them to the counter 3302C, which will load them and pass them on as the address 3310 to the RAM 3200. |
| Immediate | S1 and S2 are zero, SA is 1, and SB is zero. The 3302SA and 3302SB bits cause the MUX 3302M to select the bits 0:9 of the microcode word and pass it to the counter. Controls 3302S1 and 3302S2 are both zero, causing the counter 3302C to load the output of the MUX which, in this case, is the first nine bits of the current microcode word referred to as the immediate address, and pass it on as the address 3310 to the RM 3200. |
| CPSEL | 3302SA is zero and 3302SB is 1. Therefore, the MUX 3302M selects the output of the PROM 3302C, and outputs that value to the counter 3302C, 3302S1 and 3302S2 are zero, causing the counter to load this so-called "CPSEL" address and pass it on as the address 3610 and the RAM 3200. |
| Aux Address | 3302SA and 3302SB are 0, causing the MUX 3302M to transmit the contents of the auxiliary register 3302A to the counter 3302C, which then passes it on as the address 3310 to the RAM 3200. The auxiliary register 3302A is loaded with bits 0:9 of the microcode word when a LOADAUX command occurs in the microcode. |
| Current +1 | 3302SA, 3302SB, and CLR MUX do not matter in this case, as the counter 3302C does not load the output 3302MO of the MUX 3302M. 3302S1=0, 3302S2=1 cause the counter to increase its current value by 1, and output the new "incremented" value as the address 3310 to the RAM 3200. |
| Current | Again, 3302SA, 3302SB, and CRR MUX do not matter, as the counter is not loading. 3302S1=1, 3302S2=1 indicate to the counter 3302C that it is to hold its current value and output that as the address 3310 to the RAM 3200. |

APPENDIX C

Example of Control Hierarchy

Operation of the control hierarchy will be illustrated for matrix multiply and add. Mathematically, the process is described as:

$$D = \gamma(\alpha C + A \cdot B) \tag{1}$$

where · denotes matrix multiply. A, B, C, and D are matrices, and $\alpha$ and $\gamma$ are scalars.

In response to a programming call, a command packet from the general purpose computer enters the primitive staging register. The command packet contains information
> identifying the matrix multiply and add primitive;
> giving the locations of α and γ in SMEM;
> giving the starting addresses of arrays containing A, B, C, and D; the strides in up to six dimensions and the size in each dimension.

As a preliminary step the build CDX modules project each array onto two dimensions. Next the MMA Block Algorithm operates by breaking each matrix into blocks. 32×32 blocks are illustrated here. Referring now to FIG. 18, we see that A, B, C, and D are broken into blocks whch are indexed $A_{i,k}$, $B_{k,j}$, $C_{i,j}$ and $D_{i,j}$, respectively. The number of blocks in each direction is determined by the smallest integer larger than the quotient of matric size and 32. In the algorithm here, the blocks of D which will be computed are:

$$D_{i,j} = \gamma \left( \alpha C_{i,j} + \sum_{k=1}^{K} A_{i,j} \cdot B_{k,j} \right)$$

where $K=[M/32]$. The algorithm contains tests shown for completion of block inner product, end column in C and D, and end of problem.

The algorithm framework is illustrated in FIG. 19. Note the linear command blocks pointed to by the framework are presented here in very abbreviated form, in the rectangular boxes. Thus, the indication $R=R+A_{i,k}\cdot B_{k,j}$ in the "Extended Block Inner Product" command block just indicates the computational part of that block. Data movements of subsequent blocks of B and A also occur as indicated in Table X. Note $B_{k+1,j}$ is input from memory, as allowed by the test of $K+1<K$; also $B_{k,j}$ is moved from the Macropipeline to the zone buffer in this command block. The actual commands are shown in Table IX. Each individual command activates a particular control-forming module with the result that a more or less large set of MLO (Machine Level Operation) fields are loaded into the appropriate MLO FIFO.

The operation of the BLCK and FILL modules is specifically illustrated in Table X. Note that each MLO has an address field and a data field. The address fields are decoded in the Data Block Controller so that each data field is used to provide its assigned control. The MLOs generated by the BLCK and FILL commands are DX MLOs. They go to the SMEM DX control generator and control the movement of one block of the matrix B from SMEM into the Macropipeline. Note in the explanator material on the right that the starting address of the block and the number of words in it are specified. Also note that the row and column strides in SMEM are given. Table IX(a) explains DX MLO fields in general.

TABLE X

| SLICE to continue Block Inner Product | | |
|---|---|---|
| DX(in) | ZIO(in) | COMPUTE |
| $A_{k,j}$ | | |
| $B_{k+1,j}$ | $B_{k,j}$ | $R = R + A_{i,k+1}\cdot B_{k+1,j}$ |
| Linear Command block to continue B.I.P. | | |
| E44.10 RBLK | C.PAR2 | : NEXT ROW BLOCK OF A |
| FILL | FI.AI | : MOVE THAT BLOCK OF A |
| BLCK | C.PAR3 | : NEXT COL BLOCK OF B? |
| FILL | FI.B.TERM | : FILL IN B BLOCK |

TABLE X-continued

| S.SHIFT | | |
|---|---|---|
| ZI.LOCK | | |
| ZIO | B.TERM | |
| CP.LOCK | | |
| CP.MMA | TERM | : RESULT = $A^4B^4C$ |

| Output to MILO DX FIFO resulting from 2 commands | |
|---|---|
| Address    Data | Explanation |
| | > Input via B buffer |
| XXX1000  0111 | > Synch to ZIO |
| XXX0000  0000 000 000 000 000 110 000 | 0 Data block starts |
| XXX0001  0000 000 000 000 000 000 | 0 at word 50.332.512 |
| XXX0010  0000 000 000 000 0 0 000 | 0 32 words in block |
| XXX0011  0000 000 000 000 000  00 | 0 |
| XXX0101  0000 000 000 000 000 100 | 0 > IBR = 4 |
| XXX0110  0000 000 000 000 000 011 | 0 3 > IBC = 3 |
| XXX0111  0000 000 000 000 000 000 | 1 |
| | ↘ |
| | end slice |

The Control Generators, in general, have two phases of reaction to MLOs. In the first phase, a sequence of MLOs are decoded and data put into the proper registers until all the information necessary for one block movement or computation has been built up. In the second phase the information built up in the first phase provides detailed control. An end-of-slice bit (#23) in an MLO indicates the end of phase 1. When an MLO slice is executed, all the registers loaded in phase 1 are accessed siumultaneously, even though they were loaded sequentially. The sequential loading provides great flexibility of control, while the simultaneous access of phase 2 provides synchronous control of one or more pipelined sections of the data block path and block processor.

The "TERM" symbol on ZIO and CP commands requires that an end-of-slice bit be added to the last MLO field output as a result of that command. The FILL command results automatically in the issuance of an end-of-slice bit. A completely specified slice at one of the control generators may proceed if and only if two other conditions are met. First, the preceding slice for that control generator must be done, and second, any interlock conditions must be satisfied. The ZIO and DX control generators can be inerlocked as a pair, and the ZIO and CP generators can be interlocked. All three can also be interlocked.

The symbol CP.LOCK indicates that the CP control generator must wait for the ZIO control generator to finish before proceeding. ZI.LOCK indicates that the ZIO generator must wait for the CP generator to finish. The symbol "TERM" appended to DX commands locks the ZIO and DX control generators. Thus, in the fully interlocked slice shown in the table, all three operations on the second line of the slice must finish before any one of the three control generators can proceed.

FIGS. 20(a) and 20(b) illustrate fully-interlocked and semi-interlocked slices in general. Note that sometimes several DX and ZIO slices occur per CPO slice. This could be the case, for instance, when parameters are brought in and stored in latches. The converse can also happen: several comutations per I/O operation. If one were computing, for example $(M_{ij})^3$ for a sequence of matrix blocks, three computations would occur for each input and output.

In conclusion to this section, the control hierarchy provides a powerful and flexible means of specifying and executing the processes of a block algorithm on a very fast block processor.

What is claimed is:

1. A computing system for performing externally-specified mathematical operations on externally-specified subarrays of an array of data words stored in a system memory (SMEM) having a memory I/O port, the system comprising:

(a) a system bus, said system bus being coupled to the memory I/O port for transmitting data words to and from the SMEM;

(b) alignment means, said alignment means being coupled to said system bus for controllably selecting data words from said system bus;

(c) block processing means for performing a block operation on at least one computational block of data words, said block processor means comprising a set of processors and block storage means for storing said at least one computational block of data words, said block processing means being coupled to said alignment means.

(d) decomposition and control means for receiving an externally-supplied command packet specifying the location of at least one subarray in said SMEM and specifying an operation to be performed on said at least one specified subarray, for defining computational blocks of data words from said at least one specififed subarray, for decomposing said operation into a series of block operations on said defined computational blocks, and for generating control and address signals to control and configure said SMEM to perform, at a burst transfer rate, at least one burst transfer of a plurality of data words onto said system bus, including the words contained in a first one of said defined computational blocks, and to control and configure said alignment means to select the words contained in said first defined computational block from said burst transferred plurality of data words on said system bus, and to control and configure said block processing means to transfer said selected words of said first defined computational block to selected storage locations of said block processing means, and to perform a first one of said series of block operations on said first defined computational block, said decomposition and control means being operatively coupled to said SMEM, said alignment means, and said block processing means.

2. The system of claim 1, wherein said decomposition and control means comprises:

block decomposition means for receiving said command packets, for defining said computational blocks, for decomposing said command packet into said series of block operations on said defined computational blocks, and for generating machine level operation signals (MLO fields), said MLO fields including data movement MLO fields for specifying the movement of data words between the SMEM and said block processing means and including block operation MLO fields for specifying the block operations to be performed on said defined computational blocks of data words; and control and address signal generating means coupled to said block decomposition means and to said SMEM, said alignment means, and said block processing means, and responsive to said MLO fields for generating said control and address signals to control and configure said SMEM, said alignment means, and said block processor.

3. The system of claim 2, wherein said control and address signal generating means comprises:

data block movement control and address signal generating means responsive to said data movement MLO fields and coupled to said SMEM, said alignment means and said block processing means for generating control and address signals for transferring data between said SMEM and said block processing means;

processor control and address signal generating means responsive to said block operation MLO fields and coupled to said block processing means for controlling said block processing means to perform said first block operation on said first defined computational block of data; and means responsive to subfields in said MLO fields for synchronizing said data block movement control and address signal generating means with said processor control and address signal generating means by ensuring that all necessary data block movement operations are completed prior to issuing processor control and address signals.

4. The system of claim 1 wherein said block processing means has a plurality of ports, and wherein said system further comprises:

macropipeline means for controllably coupling said alignment means to said block processing means, said macropipeline means being coupled to said decomposition and control means and responsive to said generated control and address signals for coupling said alignment means to a selected one of said ports of said block processing means.

5. The system of claim 4 wherein said macropipeline means comprises:

a funnel buffer having first and second I/O ports, said first I/O port being coupled to said alignment means, for storing a computational block of data words; and switching means coupled to the second buffer I/O port and to said block processing means for controllably transferring selected data words between selected storage locations of said funnel buffer and said selected one of said ports of said block processing means.

6. The system of claim 1, wherein said block storage means of saids block processing means comprises:

working side storage means coupled to said processors for storing a computational block and for reading data from and writing data to said processors during a block operation; and I/O side storage means coupled to said alignment means for receiving and sending computational blocks of data;

said block processing means also having a global input port coupled between said alignment means and to each of said processors.

7. The system of claim 6, wherein said I/O side storage means has a plurality of ports, and wherein said system further comprises:

macropipeline means for controllably coupling said alignment means to said block processing means, said macropipeline means being coupled to said decomposition and control means, said alignment means, and said block processing means, and being responsive to said generated control and address signals for coupling said alignment means to said block processing means global input port or to a selected one of said ports of said I/O side storage means.

8. The system of claim 7 wherein said macropipeline means comprises:
   a funnel buffer having first and second I/O ports, said first I/O port being coupled to said alignment means for receiving and storing a computational block of data words; and
   switching means coupled to the second buffer I/O port and to said block processing means for controllably transferring selected data words between selected storage locations of said funnel buffer and said block processing means global input port or a selected one of said ports of said I/O side storage means.

9. The system of claim 8 wherein said funnel buffer comprises:
   a pair of random access memories (RAMs); and
   funnel buffer control unit means coupled to said RAMs and coupled to said decomposition and control means for translating and communicating address signals to said RAMs and for controllably switching the paths from said first and second buffer I/O ports to said RAMs so that one RAM is coupled to the first buffer I/O port when the other RAM is coupled to the second buffer I/O port.

10. The system of claim 8 wherein said decomposition and control means is operative to generate a buffer select signal and wherein said system comprises:
    a plurality of funnel buffers, each having first and second I/O ports; and
    SMEM interconnect means coupled to the first buffer I/O ports of said funnel buffers, to said alignment means, and to said decomposition and control means, for selectively coupling, in response to the buffer select signal, a selected funnel buffer to said alignment means, and for communicating address signals to said selected funnel buffer for addressing selected funnel buffer storage locations.

11. The system of claim 10, wherein said decomposition and control means is operative to generate a zone path select signal and a zone crossbar select signal, and wherein said switching means comprises:
    zone path interconnect means having a plurality of zone path ports and coupled to the second I/O port of each funnel buffer and coupled to said decomposition and control means for receiving the zone path select signal and for controllably connecting, in response to said zone path select signal, a first funnel buffer either to a second funnel buffer or to one of said zone path ports, and for communicating address signals to said funnel buffers for addressing selected funnel buffer storage locations; and
    a zone crossbar coupled to the zone path ports of said zone path interconnect means and to said I/O side storage means ports of said block processor, said zone crossbar being further coupled to said decomposition and control means for receiving the zone crossbar select signal, and for connecting, in response to said zone crossbar select signal, one of said I/O side storage means ports to one of said zone path ports.

12. The system of claim 11 wherein said decomposition and control means is operative to generate a direct path signal select and a direct crossbar select signal, and wherein said switching means further comprises:
    direct path interconnect means having a plurality of direct path ports and coupled to the second I/O port of a third one of said funnel buffers and coupled to said decomposition and control means for receiving the direct path select signal, said third funnel buffer to said second one of said funnel buffers or to a direct path port, and for communicating address signals to said funnel buffers for addressing selected funnel buffer storage locations; and
    a direct crossbar coupled to the direct path ports of said direct path interconnect means and to said processing means global input port and coupled to said decomposition and control means for receiving the direct crossbar select signal and for connecting, in response to said direct crossbar select signal, said processing means global input port to a selected direct path port.

13. The system of claim 1 wherein said SMEM comprises a plurality of local memories, and wherein said system further comprises:
    a plurality of local buses, each local bus being coupled to the I/O port of a corresponding one of said local memories; and
    synchronous data buffer means coupled to said local buses for synchronously concatenating data words transmitted on said local buses to form a wide word for transmission on said system bus;
    said alignment means being responsive to said generated control and address signals to select the words contained in said first defined computational block from the wide words on said system bus.

14. A computing system for performing externally-specified mathematic operations on externally-specified subarrays of an array of data words stored in a system memory (SMEM) having a memory I/O port, the system comprising:
    (a) a system bus, said system bus being coupled to the memory I/O port for transmitting data words to and from the SMEM;
    (b) a funnel buffer, said funnel buffer having first and second buffer I/O ports, for storing a computational block of data words of a specified subarray;
    (c) alignment means, said alignment means being coupled to said system bus and to the first buffer I/O port of said funnel buffer, for controllably transferring selected data words between said system bus and selected storage locations of said funnel buffer;
    (d) block processing means for performing a block operation on at least one computational block of data words, said block processing means including a plurality of processors and block storage means for storing said at least one computational block of data;
    (e) switching means, said switching means being coupled to the second buffer I/O port of said funnel buffer and to the block processing means for controllably transferring selected data words between selected locations of said funnel buffer and said block processing means;
    (f) block decomposition means for receiving an externally-supplied command packet specifying the locations of at least one subarray in the SMEM and specifying an operation to be performed on at least one specified subarray, for defining computational blocks of data words from said at least one specified subarray, for decomposing said operation into a series of block operations on said defined computational blocks, and for generating machine level operation signals (MLO fields) specifying machine-level operations to be performed on data words from said at least one specified subarray, said MLO fields including a data block definition set, a data block movement set and a data block computation set, said data block definition set for specifying said defined computational blocks of data words and for specifying the transfer of data words between the SMEM and said funnel buffer, said data block movement set for specifying the transfer of said defined computational blocks between said funnel buffer and said block processing means, and said data block computation set for specifying said series of block operations on said defined computational block of data words; and (g) control and address signal generating means comprising:

SMEM control and address signal generating means, said SMEM control and address signal generating means being coupled to said block decomposition means for receiving said MLO field data block definition set and coupled to the SMEM, to said alignment means, and to said funnel buffer, for generating, in response to said MLO field data block definition set, SMEM control and address signals to control and configure the SMEM to perform, at a burst transfer rate, a burst transfer of a plurality of data words onto said system bus, including the words in a first one of said defined computational blocks, and to control and configure said alignment means to select the words contained in said first defined computational block from said burst transferred words on the system bus, and to transfer said first defined computational block of words between said system bus and selected storage locations of said funnel buffer;

pipeline control and address signal generating means, said pipeline control and address signal generating means being coupled to said block decomposition means for receiving said MLO field data block movement set and coupled to said funnel buffer, said switching means, and to said block processing means, for generating, in response to said MLO field data block movement set, block movement control and address signals to control and configure said switching means and said block processing means to transfer said first defined computational block of words between selected locations of said funnel buffer and selected storage locations of said block processing means; and processor control and address signal generating means, said processor control and address signal generating means being coupled to said block decomposition means for receiving said MLO field data block computation set and coupled to said block processing means for generating, in response to said MLO field data block computation set, processor control and address signals to configure and control said block processing means to perform a first one of said series of block operations on said first defined computational block of words.

15. The system of claim 14 wherein said block storage means of said block processing means comprises:

working side storage means coupled to said processors for storing a computational block and for reading data from and writing data to said processors during a block operation; and I/O side storage means coupled to said switching means for receiving and sending computational blocks of data;

said block processor means also having a global input port coupled between said switching means and each of said processors.

16. The system of claim 14 wherein said block processing means comprises a set of N vector processors, where N is an integer, a set of N working side buffers for writing data to and reading data from said vector processors during a block operation, a set of N I/O side buffers coupled to said switching means for receiving and sending a computational block of data, and a global input port coupled to each of said vector processors.

17. The system of claim 14 wherein said SMEM comprises a plurality of local memories, and wherein said system further comprises:

a plurality of local buses, each local bus being coupled to the I/O port of a corresponding one of said local memories; and a synchronous data buffer means coupled to said local buses for synchronously concatenating data words transmitted on said local buses to form a wide word for transmission on said system bus; and said alignment means being responsive to said block movement control and address signals to select the words contained in said first defined computational block from said wide words on said system bus.

18. The system of claim 14 wherein said funnel buffer comprises:

a pair of random access memories (RAMs); and funnel buffer control unit means coupled to said RAMs and coupled to said SMEM control and address and address signal generating means for translating and communicating address signals to said RAMs and for controllably switching the paths from the first and second buffer I/O ports to said RAMs so that one RAM is coupled to the first buffer I/O port when the other RAM is coupled to the second buffer I/O port.

19. The system of claim 15, wherein said SMEM control and address signal generating means is operative to generate a buffer select signal, and wherein said system further comprises:

a plurality of funnel buffers, each having first and second I/O ports; and

SMEM interconnect means coupled to the first buffer I/O ports of said funnel buffers, to said alignment means, and to said SMEM control and address signal generating means, for selectively coupling, in response to the buffer select signal, a selected funnel buffer to said alignment means, and for communicating address signals to said selected funnel buffer for addressing selected funnel buffer storage locations.

20. The system of claim 19, wherein said I/O side storage means of said block processing means has a plurality of ports and said pipeline control and address signal generating means is operative to generate a zone path select signal and a zone crossbar select signal, and wherein said switching means comprises:

zone path interconnect means having a plurality of zone path ports and coupled to the second I/O port of each funnel buffer and coupled to said pipeline control and address signal generating means for receiving the zone path select signal and for controllably connecting, in response to said zone path select signal, a first funnel buffer either to a second funnel buffer or to one of said zone path ports, and for communicating address signals to said funnel buffers for addressing selected funnel buffer storage locations; and a zone crossbar coupled to the zone path ports of said zone path interconnect means and to said I/O side storage means ports of said block processor, and coupled to said pipeline control signal generating means for receiving the zone crossbar select signal, and for connecting, in response to said zone crossbar select signal, one of said I/O side storage means ports to one of said zone path ports.

21. The system of claim 20, wherein the pipeline control and address signal generating means is operative to generate a direct path select signal and a direct crossbar select signal, and wherein said switching means further comprises:

direct path interconnect means having a plurality of direct path ports and coupled to the second I/O port of a third one of said funnel buffers and coupled to said pipeline control and address signal generating means for receiving the direct path select signal, and for connecting, in response to said direct path select signal, said third funnel buffer to said second one of said funnel buffers or to a selected direct path port, and for communicating address signals to said funnel buffers for addressing selected funnel buffer storage locations; and a direct crossbar coupled to the direct path ports of said direct path interconnect means and to said processor global input port and coupled to said pipeline control signal generator means for receiving the direct crossbar select signal and for connecting, in response to said direct crossbar select signal, said processor global input port to a selected direct path port.

22. The system of claim 14, wherein said block decomposition means is operative to generate and transmit END-OF-SLICE signals for delimiting slices wherein said slices are groups of MLO fields that specify all the aspects of an identifiable block process within one section of the system, and wherein said SMEM control and address signal generating means comprises:

SMEM control staging register means, coupled to said block decomposition means, for receiving and storing a data block definition MLO slice;

SMEM control working register means coupled to said SMEM control staging register means, for storing an SMEM control word;

SMEM control synchronizing means coupled to said SMEM control working register means, for loading the contents of said SMEM control staging register means into said SMEM control working register means to form said SMEM control word;

SMEM control word executing means coupled to said SMEM working register means, for executing said SMEM control word; and wherein said pipeline control and address signal generating means comprises:

pipeline control staging register means, coupled to said block decomposition means, for receiving and storing a data block movement MLO slice;

pipeline control working register means coupled to said pipeline control staging register means, for storing a pipeline control word;

pipeline control synchronizing means coupled to said pipeline control working register means, for loading the contents of said pipeline control staging register means into said pipeline control working register means to form said pipeline control word; and pipeline control word executing means coupled to said pipeline working register means, for executing said pipeline control word; and wherein said processor control signal generating means comprises:

processor control staging register means, coupled to said block decomposition means, for receiving and storing a data block computation MLO slice;

processor control working register means coupled to said processor control staging register means, for storing a processor control word;

processor control synchronizing means coupled to said processor control working register means, for loading the contents of said processor control staging register means into said processor control working register means to form said processor control word; and processor control word executing means coupled to said processor working register means, for executing said processor control word;

whereby each of said control and address signal generating means can execute a control word while an MLO slice is being received to form the next control word.

23. The system of claim 22 wherein:

said SMEM control word executing means is coupled to said corresponding SMEM control synchronizing means and is operative to transmit a DONE signal to said corresponding SMEM control synchronizing means after said SMEM control word executing means has finished execution of an SMEM control word;

said pipeline control word executing means is coupled to said pipeline control synchronizing means and is operative to transmit a DONE signal to said corresponding pipeline control synchronizing means after said pipeline control word executing means has finished execution of a pipeline control word;

said processor control word executing means is coupled to said processor control synchronizing means and is operative to transmit a DONE signal to said corresponding processor control synchronizing means after said processor control word executing means has finished execution of a processor control word;

said SMEM control synchronizing means is operative, in response to both said DONE signal from said SMEM control word executing means and an END-OF-SLICE signal, to load the contents of said SMEM control staging register means into the corresponding SMEM control working register means;

said pipeline control synchronizing means is operative, in response to both said DONE signal from said pipeline control word executing means and an END-OF-SLICE signal, to load the contents of said pipeline control staging register means into the corresponding pipeline control working register means; and said processor control synchronizing means is operative, in response to both said DONE signal from said processor control word executing means and an END-OF-SLICE signal, to load the contents of said processor control staging register means into the corresponding processor control working register means.

24. The system of claim 23 wherein:

each of said SMEM control staging register means, pipeline control staging register means, and processor control staging register means comprises a plurality of addressable staging registers;

said block decomposition means is operative to include a staging register address with each MLO field; and said SMEM control and address signal generating means further comprises decoding means for loading each MLO field into the SMEM control staging register means addressed by said staging register address;

said pipeline control and address signal generating means further comprises decoding means for loading each MLO field into the pipeline control staging register means addressed by said staging register address;

said processor control and address signal generating means further comprises decoding means for loading each MLO field into the processor control staging register means addressed by said staging register address;

whereby an MLO slice may consist of selected MLO fields to be modified to form a control word comprising said selected MLO fields and the unmodified MLO fields from a previous control word.

25. The system of claim 23 wherein:

said SMEM control and address signal generator means is bi-directionally coupled to said pipeline control and address signal generator means for transmitting and receiving an intercontroller synchronization signal for synchronizing the execution of the SMEM control word and the pipeline control word;

said pipeline control and address signal generator means is bi-directionally coupled to said processor control signal generator means for transmitting and receiving an intercontroller synchronization signal for synchronizing the execution of the pipeline control word and the processor control word;

said block decomposition means is operative to generate and transmit an interlock signal associated with an MLO slice to interlock said MLO slice with a designated control and address signal generating means;

said SMEM control word executing means of said SMEM control and address signal generating means is operative, in response to an SMEM control word formed from an interlocked MLO slice, to transmit a DONE signal to the corresponding SMEM control word synchronizing means when said SMEM control word executing means has finished execution of said SMEM control word and said SMEM control word executing means has received an intercontroller synchronization signal from the designated control and address signal generating means;

said pipeline control word executing means of said pipeline control and address signal generating means is operative, in response to a pipeline control word formed from an interlocked MLO slice, to transmit a DONE signal to the corresponding pipeline control word synchronizing means when said pipeline control word executing means has finished execution of said pipeline control word and said pipeline control word executing means has received an inter-controller synchronization signal from the designated control and address signal generating means; and said processor control word executing means of said processor control and address signal generating means is operative, in response to a processor control word formed from an interlocked MLO slice, to transmit a DONE signal to the corresponding processor control word synchronizing means when said processor control word executing means has finished execution of said processor control word and said processor control word executing means has received an inter-controller synchronization signal from the designated control and address signal generating means.

26. The system of claim 16 wherein:

said data block computation set of MLO fields includes array-defining MLO fields for designating a starting address, a row stride, and a column stride;

and wherein said processor control and address signal generating means comprises:

processor control signal generating means for generating processor control signals for controlling said block processor, and for generating a column update signal and a next row signal; and doubly-strided address generating means coupled to said processor control signal generating means for computing a series of linear addresses of storage locations in a block processor working side buffer, in response to said starting address, row stride, column stride, a plurality of column update signals, and a plurality of next row signals, thereby generating a series of linear addresses for designating the storage locations of the data words in the two-dimensional array defined by said array-defining MLO fields;

said processor control signal generating means being operative to generate a series of processor control signal words containing processor control signals, each of said processor control signal words being associated both with an operation to be performed on a data word and with one of the series of linear addresses computed by said doubly-strided address generated means, for controlling said block processing means to perform a set of operations on a data word stored at said linear address.

27. The system of claim 26 wherein said vector processors are pipelined processors having a plurality of processing stages, and wherein said processor control and address signal generating means further comprises delay means for timing the transmission of the processor control signals in the processor control signal word to each stage of a vector processor.

28. A method for performing externally-specified mathematical operations on externally specified subarrays of an array of data stored in a system memory (SMEM), said method comprising the steps of:

(a) receiving an externally-supplied command packet, said packet specifying the location of at least one subarray in the SMEM, specifying an operation to be performed on said at least one specified subarray, and specifying the desired location of a result subarray of data words;

(b) defining at least one computational block of data words from said at least one specified subarray;

(c) decomposing the specified operation into at least one block operation on said at least one defined computational block to produce at least one result block;

(d) designating the locations in said result subarray for storing the words in said at least one result block;

(e) generating control and address signals for moving data and performing said at least one block operation;

(f) in response to said control and address signals;

(i) performing a burst transfer of a plurality of data words from the SMEM onto a system bus (SBUS), said plurality of burst transferred data words including the words contained in a first one of said at least one defined computational blocks;

(ii) selecting the data words contained in said first defined computational block from the words on said SBUS;

(iii) transferring said selected words in said first defined computational block to selected storage locations in a block processor;

(iv) performing a first one of said series of block operations on said selected words in said first defined computational blocks to produce a first result block of data words; and (v) transferring the data words in said first result block to the designated locations in said result subarray.

29. The method of claim 28 wherein said decomposing step produces at least two block operations on at least two computational blocks and wherein steps (f)(i) through (f)(v) are repeated for at least a second defined computational block and at least a second block operation until all of said block operations have been performed, thereby producing said result subarray.

30. The method of claim 28 further comprising, before said control and address signal generating step, the step of generating, in response to said command packet, machine level operation signals (MLO fields), specifying the movement of data words between the SMEM and the block processor and specifying the block operations to be performed on said defined computational blocks, said control and address generating step being performed in response to said MLO fields.

31. The method of claim 28 wherein said transferring step (f)(iii) comprises:

transferring said selected words in said first defined computational block to selected locations in a funnel buffer coupled to the SMEM and the block processor;

storing said selected words in said first defined computational block in said funnel buffer; and transferring said stored words in said first defined computational block from said funnel buffer to selected storage locations in said block processor.

32. The method of claim 30 wherein said transferring step (f)(v) comprises:

transferring the data words in said first result block to selected locations in a funnel buffer;

storing said result block in said funnel buffer; and transferring the data words in said result block from said funnel buffer to the designated locations in said result subarray.

* * * * *